United States Patent [19]
Nagai et al.

[11] Patent Number: 5,481,482
[45] Date of Patent: Jan. 2, 1996

[54] PRESSURE INFORMATION PROCESSING SYSTEM SUITABLE FOR USE IN A VACUUM UNIT

[75] Inventors: Shigekazu Nagai; Shigeru Sugano; Mitsuhiro Saito; Takashi Takebayashi; Hiroshi Matsushima; Yoshiharu Ito, all of Ibaraki, Japan

[73] Assignee: SMC Kabushiki Kaisha, Tokyo, Japan

[21] Appl. No.: 293,601

[22] Filed: Aug. 22, 1994

Related U.S. Application Data

[63] Continuation of Ser. No. 941,259, Sep. 4, 1992, abandoned.

[30] Foreign Application Priority Data

Sep. 5, 1991 [JP] Japan ..................... 3-226195

[51] Int. Cl.[6] .................... G01L 27/00; G01L 13/00
[52] U.S. Cl. ............................... 364/558; 73/4 V
[58] Field of Search ...................... 364/558, 550; 73/4 V, 4 R, 37, 749, 753; 294/64.1, 64.2; 137/557, 526; 15/319, 339

[56] References Cited

U.S. PATENT DOCUMENTS

| | | | |
|---|---|---|---|
| 4,378,523 | 3/1983 | Norman | 73/4 V X |
| 4,687,021 | 8/1987 | Ise et al. | 137/526 |
| 4,733,431 | 3/1988 | Martin | 15/339 |
| 4,942,758 | 7/1990 | Cofield | 73/49.2 |
| 4,991,404 | 2/1991 | Yassa | 73/749 X |
| 5,117,675 | 6/1992 | Notoyama et al. | 73/37 |
| 5,201,560 | 4/1993 | Golden | 294/64.2 |
| 5,324,087 | 6/1994 | Shimose et al. | 294/64.1 |

*Primary Examiner*—Emanuel T. Voeltz
*Assistant Examiner*—M. Kemper
*Attorney, Agent, or Firm*—Oblon, Spivak, McClelland, Maier & Neustadt

[57] ABSTRACT

In a vacuum unit which can electrically process information, a vacuum pressure value is detected by a detecting device and a desired pressure value is set by a setting device. The so-set desired pressure value is digitally displayed on a displaying device and stored in a storing device. The set desired pressure value is compared with the detected vacuum pressure value by a determining device. When the result of comparison is brought to a given value, it is determined that an unusual or improper state has been developed. When the set desired pressure value and the detected vacuum pressure value coincide with each other in a predetermined range, a predetermined signal is produced from an output device. The displaying device is provided with an adjusting device capable of adjusting the state of visual recognition of each pressure value.

8 Claims, 15 Drawing Sheets

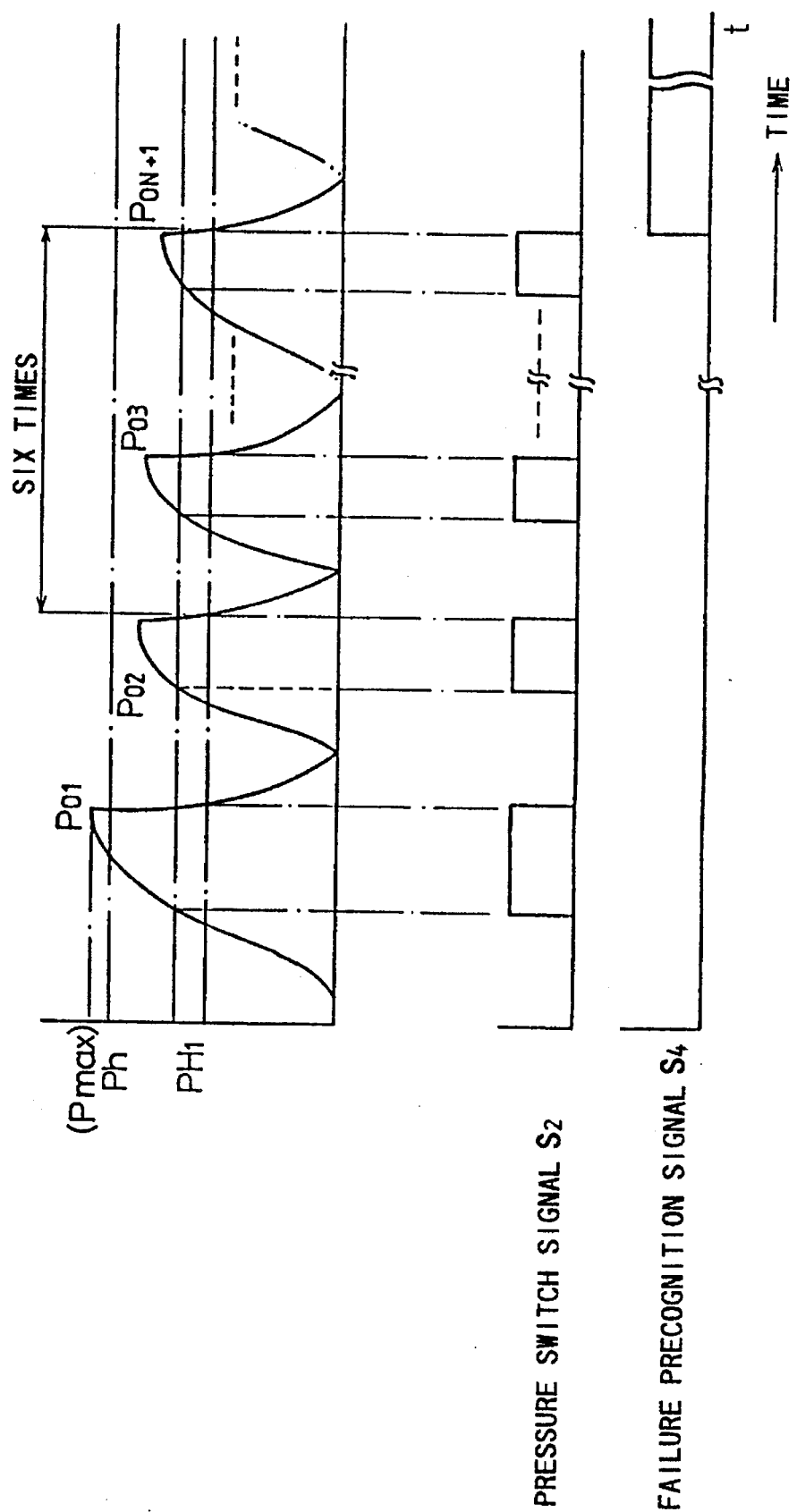

PRESSURE INFORMATION PROCESSING SYSTEM SUITABLE FOR USE IN A VACUUM UNIT

This application is a continuation of application Ser. No. 07/941,259, filed on Sep. 4, 1992, now abandoned.

BACKGROUND OF THE INVENTION

1. Field of the Invention

The present invention relates to a vacuum unit, and more specifically to a vacuum unit having monitoring and control features associated therewith.

2. Description of the Related Art

Heretofore, pressure switches for negative pressure and/or positive pressure have widely been employed in a pneumatic apparatus or the like.

A description will now be made of one example illustrative of a pressure switch for negative pressure, which is actuated to convert a pressure value into a pressure signal or an electric signal. Such a pressure switch is employed in a negative pressure (vacuum) system including pressurized air, a fluid passage and a pneumatic apparatus or the like. That is, the pressure switch is used to confirm whether a subject or object (workpiece) to be fed has been attracted by or released from a suction pad or cup.

The pressure switch is provided with a pressure switch signal generating circuit comprising a carrier diffusion type semiconductor pressure sensor, a comparator, a variable resistor, an output circuit (for generating a pulse signal), etc. The pressure switch signal generating circuit generates an output signal $S_1$ corresponding to a differential pressure developed due to a change in pressure (see M in FIG. 1) at the time of suction and release (i.e., vacuum break) of the workpiece. Incidentally, the differential pressure is provided to avoid undesired chattering action.

Now, a threshold value PH (corresponding to the leading edge of the output signal $S_1$) of the differential pressure shown in FIG. 1 is compared with a reference value set by the variable resistor by using the comparator supplied with the output signal $S_1$ from the carrier diffusion type semiconductor pressure sensor. The output signal $S_1$ is supplied to a sequence controller operable with a computer for FA (Factory Automation) and the like, for example, so as to be used for various control driving means or the like. Further, the output signal $S_1$ is used as a module for a CIM and enables a control operation including a determining or judging function.

In the above prior art, however, the pressure switch is not normally provided with a vacuum displaying means. Therefore, a process for attracting the workpiece or releasing the same is repeatedly performed when the threshold value PH or the like is determined. Then, the variable resistor or the like is used to set and adjust each of corresponding pressure values so as to determine the threshold value PH. Thus, when a number of pressure switches are disposed in the pneumatic apparatus or the like, it is necessary for the switches to drive the pneumatic apparatus or the like and carry out the setting and adjustment of the corresponding pressure values, both of which require a relatively large amount of effort. Further, there is developed an error between each of the corresponding pressure value and a preset value, thus creating difficulty in quantitatively setting the pressure values. Furthermore, the pressure values are set and adjusted in analog form, thereby causing inconvenience, in that it is difficult to accurately set the pressure values.

Further, even if a normal pressure displaying means is used, a display confirming operation itself is rendered difficult because the representation of a set pressure value is made in plane form upon its visual recognition.

SUMMARY OF THE INVENTION

It is a general object of the present invention to provide a system for electrically processing pressure information, which is employed in a vacuum unit, which enables the setting of a desired pressure value to be carried out relatively easily in order to produce a predetermined signal employed in the vacuum unit and which provides for easy visual recognition of pressure values. A predetermined signal is produced when each of the set pressure values and a desired pressure value coincide with each other, and the visual representation of the set pressure values based on the predetermined signal can be easily made.

It is a principal object of the present invention to provide a system for electrically processing pressure information, which is suitable for use in a vacuum unit, the system comprising detecting means for detecting a vacuum pressure value, setting means for setting a desired pressure value, displaying means for digitally displaying the desired pressure value, storing means for storing the desired pressure value therein, determining means for comparing the desired pressure value set by the setting means and stored in the storing means with the detected vacuum pressure value and for determining that an improper state has been developed when the result of comparison is brought to a given value, and outputting means for outputting a predetermined signal when the set desired pressure value and the detected vacuum pressure value, which have been compared by the determining means, coincide with each other in a predetermined range, the displaying means being provided with adjusting means for adjusting the state of visual recognition of each pressure value.

It is another object of the present invention to provide a system for electrically processing pressure information, which is suitable for use in a vacuum unit, wherein the adjusting means includes a link mechanism.

It is a further object of the present invention to provide a system for electrically processing pressure information, which is suitable for use in a vacuum unit, wherein the determining means includes means for counting the number of pressure values that are lower than the set desired pressure value and for producing a signal indicative of an improper state when the counted number of pressure values has reached a predetermined value.

It is a still further object of the present invention to provide a system for electrically processing pressure information, which is suitable for use in a vacuum unit, wherein the detecting means is provided with displaying means for digitally displaying the vacuum pressure value detected by the detecting means.

It is a still further object of the present invention to provide a system for electrically processing pressure information, which is suitable for use in a vacuum unit, wherein displaying means for digitally displaying at least a pressure value used for the determination of the improper state and a pressure value used for failure precognition is provided.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

A pressure information processing system employed in a vacuum unit according to the present invention will hereinafter be described in detail with reference to the accompanying drawings in which preferred embodiments are shown by way of illustrative example.

A pressure information processing system 10, which has been incorporated in a vacuum unit according to the present invention, will first be described with reference to FIG. 2.

Figure 1:
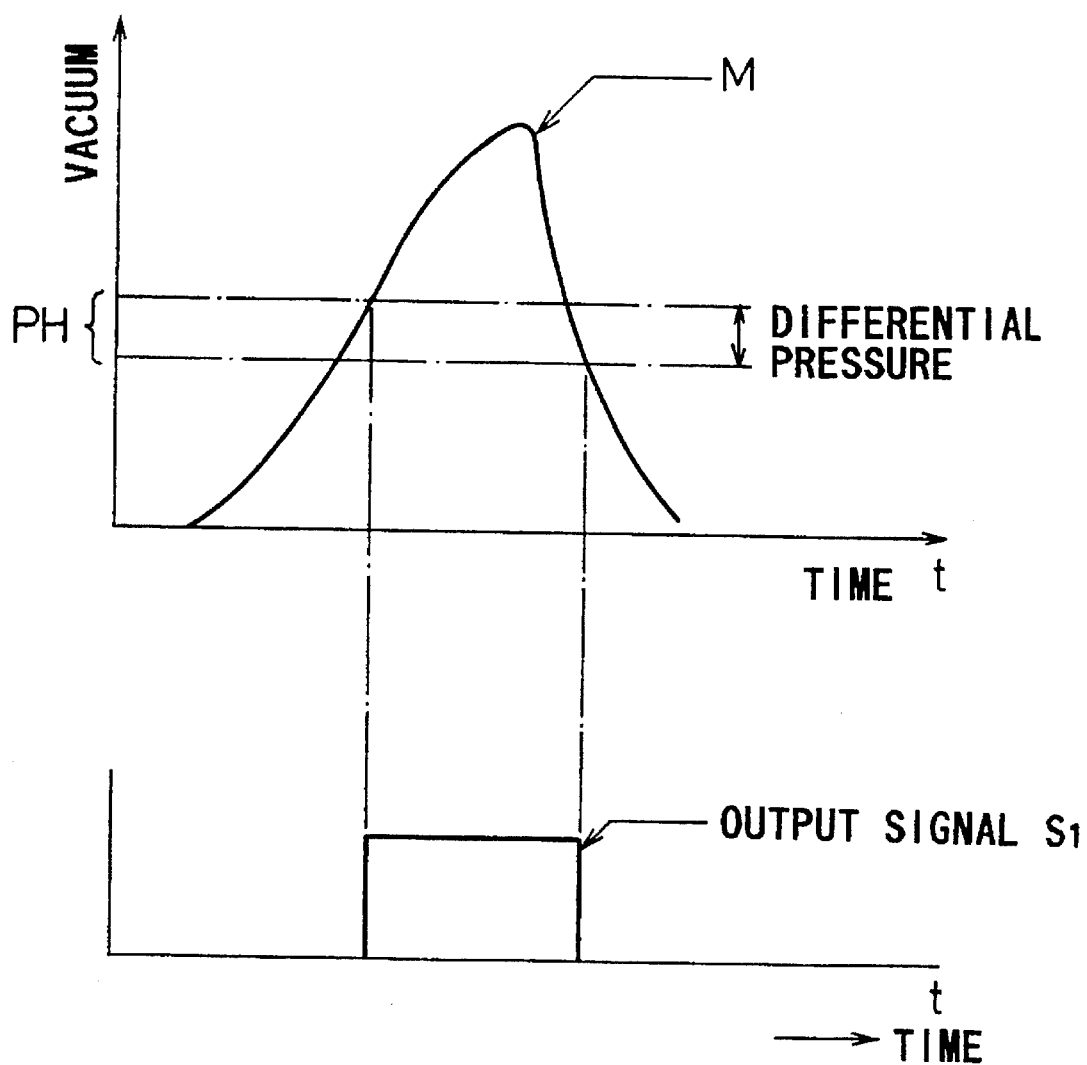
FIG. 1 is a view for describing the operation of a conventional vacuum unit.
Figure 2:
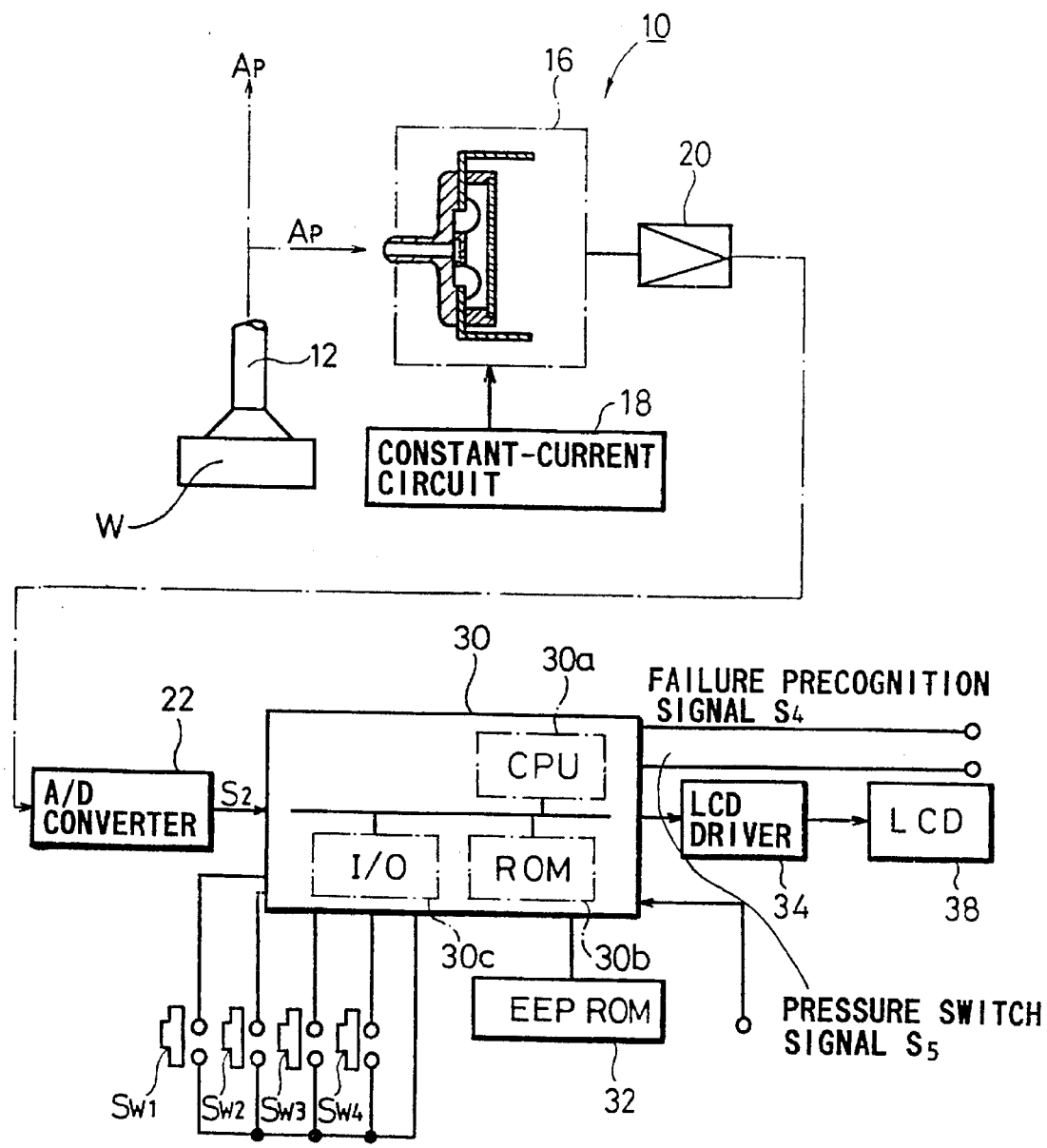
FIG. 2 is a block circuit diagram showing a pressure information processing system employed in a vacuum unit according to the present invention.

In FIG. 2, reference symbol W indicates a workpiece and reference numeral 12 indicates a workpiece suction pad or cup mounted on a delivering means employed in a vacuum system. The pressure information processing system 10 comprises a semiconductor pressure sensor 16 for detecting the value (negative pressure, i.e., vacuum) of pressurized air Ap so as to output a detected signal therefrom, a constant-current circuit 18 and an amplifier 20. Further, the pressure information processing system 10 also includes an A/D converter 22 for converting a signal outputted from the amplifier 20, i.e., an analog signal corresponding to the value (vacuum) of the pressurized air Ap into a digital detection signal $S_2$, and a controller 30 such as a one-chip microcomputer or the like. The controller 30 is provided with a CPU 30$a$, a ROM 30$b$ with a program stored therein, and an I/O 30$c$, and includes set-value up/down switches $S_{W1}$, $S_{W2}$ to be described later, a set switch $S_{W3}$ for setting a changed value, and a reset switch $S_{W4}$ for resetting the set value, all of which are electrically connected to the controller 30. Also connected to the controller 30 are an EE($E^2$)PROM 32 capable of storing therein information to be described later and retaining the information therein when a power source is turned off, and an LCD driver 34 and an LCD 38 which are used to visually display set values and information which will be described later. In the pressure information processing system 10, an analog circuit and/or a digital circuit can be replaced with a programmable equalizing means for DSP (Digital Signal Processing) or the like.

The vacuum unit incorporating the pressure information processing system constructed as described above therein will now be shown in FIG. 3.

Figure 3:
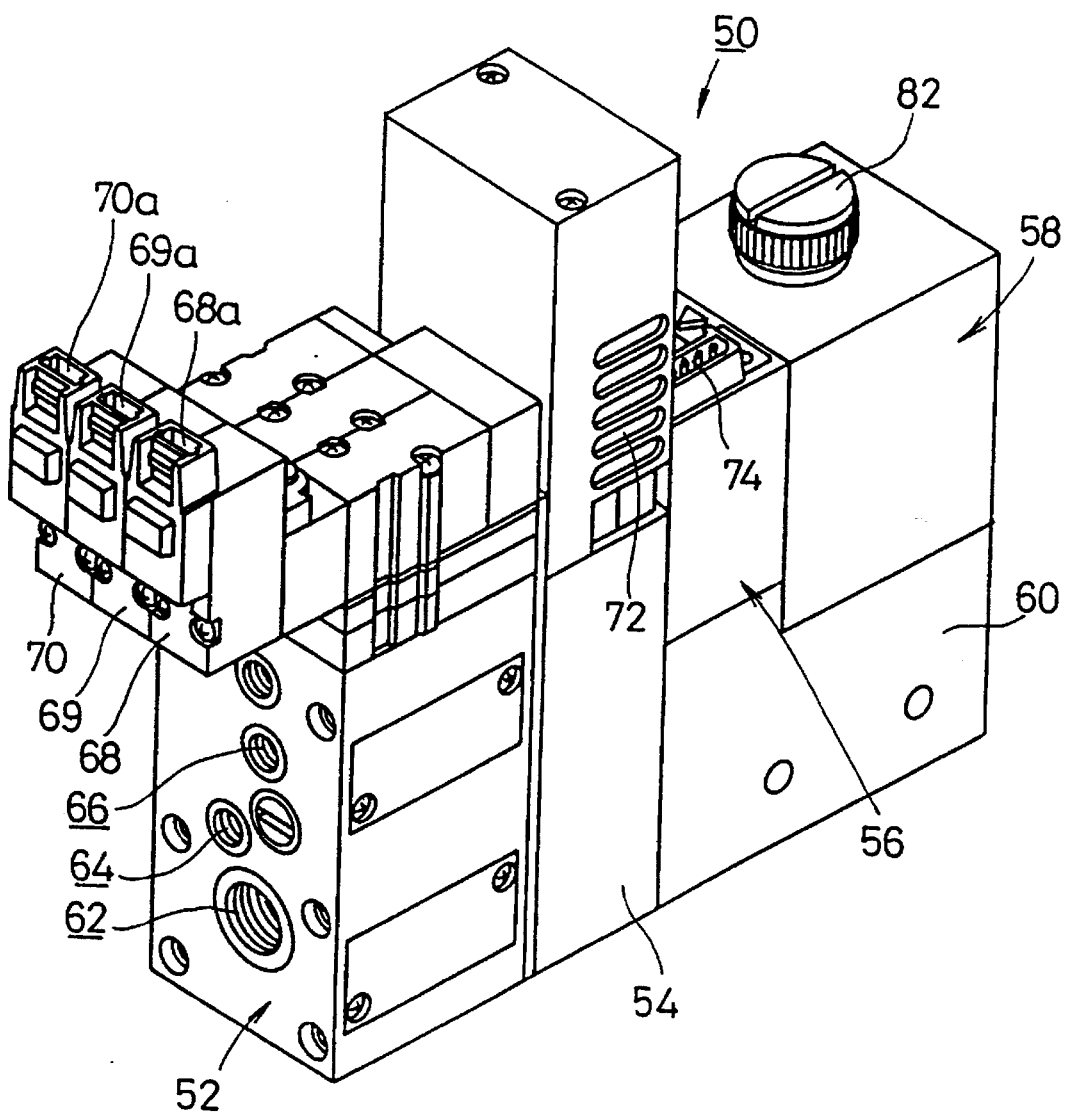
FIG. 3 is an overall perspective view illustrating the vacuum unit according to the present invention.
Figure 4:
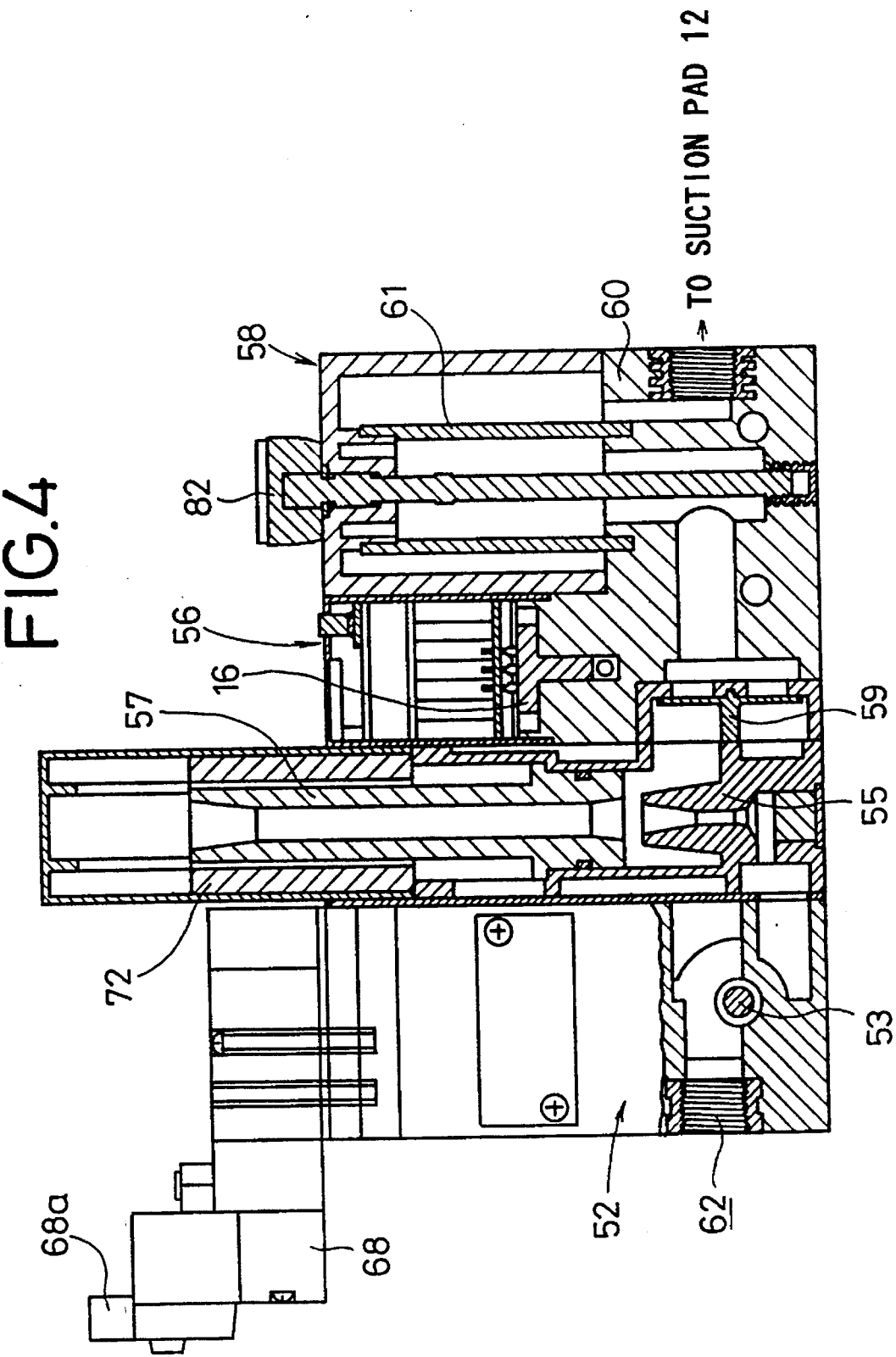
FIG. 4 is a partly-omitted vertical cross-sectional view showing the vacuum unit depicted in FIG. 3.

In FIGS. 3 and 4, reference numeral 50 indicates a vacuum unit. The vacuum unit 50 basically comprises a valve block 52, an ejector 54, a detecting unit 56, a filter 58 and a connecting member 60. The valve block 52 has an air feed port 62, an air feed port 64 for a pilot valve and an air feed port 66 for vacuum break, all of which are defined therein, a poppet valve 53 disposed therein for feeding compressed air to the ejector 54 and blocking the same, and first, second and third electromagnetic valves 68, 69, 70 mounted on the upper surface thereof.

The first electromagnetic valve 68 and the second electromagnetic valve 69 are of pilot-operated electromagnetic valves for compressed-air feed valves, which are comprised of self-holding type double solenoids or latching solenoids. The third electromagnetic valve 70 is of a pilot-operated electromagnetic valve for the vacuum break. In order to supply electric power and a control signal such as an ON/OFF signal to the outside via unillustrated conductors, the first, second and third electromagnetic valves 68, 69 and 70 are provided with first, second and third connectors 68$a$, 69$a$, 70$a$ respectively.

The ejector 54 is provided adjacent to the valve block 52. In addition, the ejector 54 has a nozzle 55 and a diffuser 57 both disposed therein, and a silencer 72 mounted on the side face of the ejector 54. The silencer 72 serves to silence sound produced by pressurized air fed from the diffuser 57.

Figure 5:
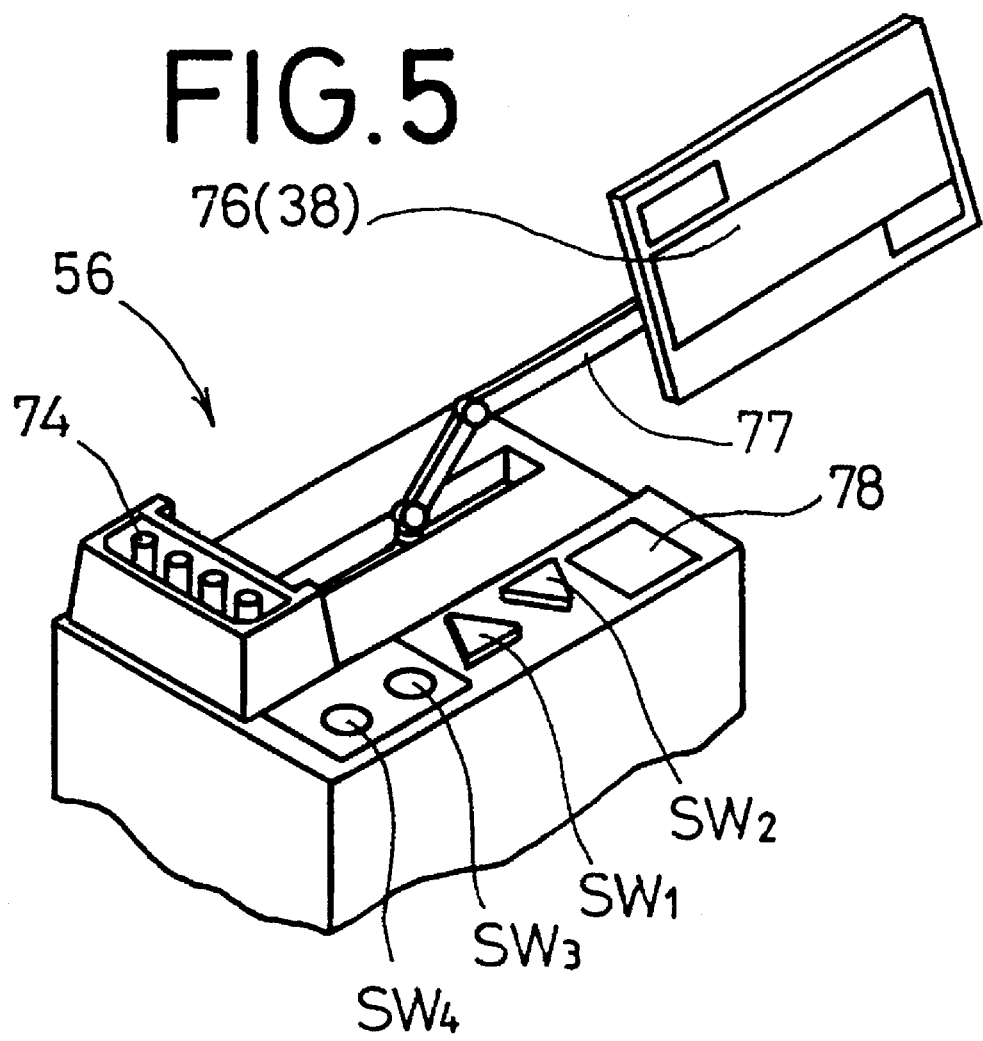
FIG. 5 is a partly-cut perspective view illustrating a detecting unit and a display unit of the vacuum unit shown in FIG. 3.

The detecting unit 56 detects pressure under vacuum and includes the semiconductor pressure sensor 16 disposed therein. As shown in FIG. 5, the detecting unit 56 also includes, on the upper part thereof, a connector 74, a digital display unit 76, an up switch $S_{W1}$, a down switch $S_{W2}$, a set switch $S_{W3}$, a reset switch $S_{W4}$, and a display unit 78.

The digital display unit 76 includes a liquid crystal displaying means and can perform visual representation of "failure", "break down" or the like in either English character or other language, for example. In order to facilitate the reading of information, the digital display unit 76 is constructed in such a manner that a visually-observing angle can be adjusted by a hinge, a multi-articulated link 77, etc. (see FIG. 5).

The filter 58 has a main body 61 disposed therein, which includes a hydrophobic material therein and serves to prevent water or moisture from entering therein. In addition, the filter 58 is detachably mounted on the connecting member 60 by a control 82.

It is needless to say that each of the valve block 52, the ejector 54, the silencer 72, the detecting unit 56 and the filter 58 is in communication in such a manner that pressurized fluids can flow through each of internal passages. A check valve 59 is disposed in a passage which connects the ejector 54 to the filter 58. In particular, there are disposed in the detecting unit 56, the semiconductor pressure sensor 16 (including a differential pressure type pressure sensor and a capacity type pressure sensor, for example) comprised of a piezo or the like, the constant-current circuit (constant-voltage circuit) 18, the amplifier 20, the A/D converter 22, the controller 30, the EE(E$^2$)PROM 32, the LCD driver 34, etc.

The connector 74 can be electrically-connected with conductors to produce a failure precognition signal $S_4$ and a pressure switch signal $S_6$ shown in FIG. 2. The connector 74 can also be connected with a power source corresponding to the detecting unit 56, and a control signal conductor. In order to provide another vacuum unit, an external control apparatus, etc. with their corresponding information such as pressure detection information and control information, the connector 74 can also be provided with a controller having a communication function, which is connected in continuation to a manifold, in such a manner that it has communication functions such as a sound transmitting function, a wireless transmitting function, an optical-fiber transmitting function, etc. Incidentally, the first connector 68a, the second connector 69a, the third connector 70a and the connector 74 may be integrally formed to control, a control signal to be fed to each valve, confirmation for the attraction of the work-piece W, failure precognition information, etc.

Figure 7:
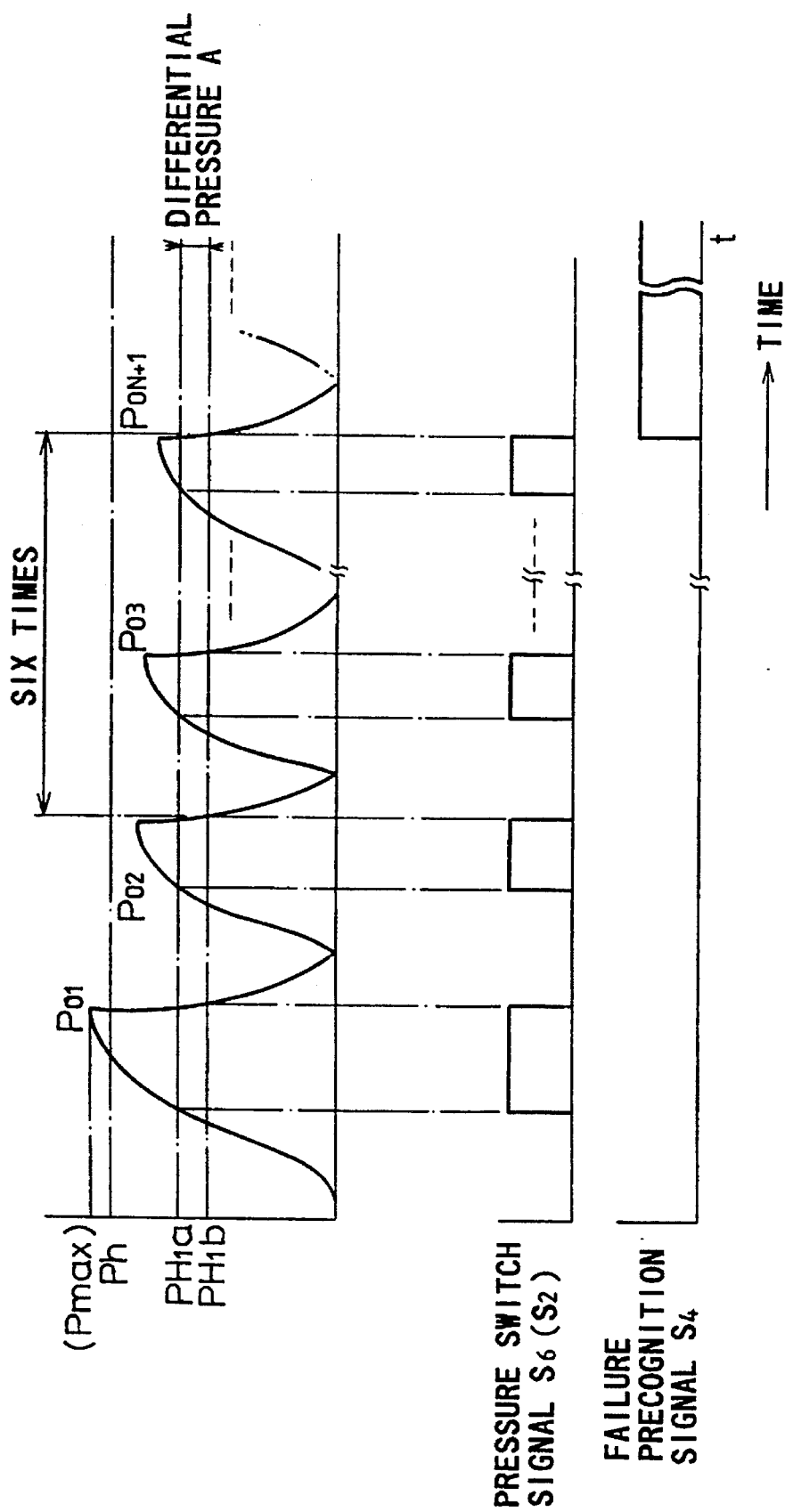
FIG. 7 is a view for describing a method of setting threshold values in the vacuum unit according to the present invention.

In the vacuum unit 50 constructed as described above, when an operation start instruction signal is first input, compressed air is introduced from the air feed port 62 so as to produce a vacuum in the ejector 54. This vacuum reaches the workpiece suction cup 12 coupled to an unillustrated port of the connecting member 60. Thus, the workpiece suction cup 12 attracts and holds the workpiece W in response to the operation of a conveying means such as a robot. Then, the workpiece suction cup 12 is inactivated to release the workpiece W. As a result, the pressure (vacuum) successively applied to the semiconductor pressure sensor 16 in the detecting unit 56 is represented in the form of pressure values sequentially varied as illustrated in FIG. 7, i.e., $P_{O1}, P_{O2}, P_{O3}, \ldots, P_{ON+1}$. As is clear from the drawings, a situation often arises in which the lowest pressure (i.e., highest degree of vacuum) increases with time due to, for example, leakage of air around the suction cup 12 or clogging of the filter.

Now, a signal corresponding to each of the pressure changes or values $P_{O1}, P_{O2}, P_{O3}, \ldots, P_{ON+1}$ is supplied via the semiconductor pressure sensor 16 and the amplifier 20 to the A/D converter 22 where it is converted into a digital detection signal $S_2$, which is, in turn, input to the controller 30.

In the controller 30, the maximum value ($P_{max}$) of the pressure change $P_{O1}$ first specifies a first address of the EE(E$^2$)PROM 32 and is then stored thereat.

Afterwards, the switch $S_{W3}$ is turned ON to compute threshold values $PH_{1a}, PH_{1b}$ for providing a differential pressure A therebetween, which threshold values are stored in the EE(E$^2$)PROM 32. At this time, a second address of the EE(E$^2$)PROM 32 is specified and 70% (threshold value $PH_{1a}$) of the maximum value ($P_{max}$) is computed and stored at the specified second address. Then, a third address of the EE(E$^2$)PROM 32 is specified and 65% (threshold value $PH_{1b}$) of the maximum value ($P_{max}$) is computed and stored at the specified third address.

Now, a pressure switch signal $S_6$, which appears depending on the pressure changes $P_{O1}$ through $P_{ON+1}$ is continuously produced in association with the threshold values $PH_{1a}, PH_{1b}$. The pressure switch signal $S_6$ is used for full-closed control of various control driving means such as a delivering device and for information processing in an FMS, a CIM, etc.

Then, a fourth address of the EE(E$^2$)PROM 32 is specified and 80% (threshold value Ph) of the maximum value ($P_{max}$) is computed and stored at the specified fourth address.

The threshold value Ph represents a point reduced by 20% of the normal highest measured vacuum pressure value, i.e., the maximum value ($P_{max}$) of the pressure change $P_{O1}$. Pressure values below the threshold value Ph are regarded as being unwanted or improper pressure states.

Then, the improper pressure values or changes below the threshold value Ph corresponding to the failure precognition determining vacuum, i.e., the pressure changes $P_{O2}$ through $P_{ON+1}$ (each corresponding to the digital detection signal $S_2$, for example) of the pressure changes $P_{O1}$ through $P_{ON+1}$ are cumulatively stored six times. When the improper pressure values thus stored have coincided with improper set values counted six times, which have been previously set by the switches $S_{W1}, S_{W2}$ and $S_{W3}$, the failure precognition signal $S_4$ is continuously produced.

A process for producing the failure precognition signal $S_4$, for example, is made by executing the program of the controller 30. In addition, information on such a process is stored in the EE(E$^2$)PROM 32. When the controller 30 is activated again after the power source has been turned off, the failure precognition signal $S_4$ is produced based on the operation state of the controller 30, thereby making it possible to read the information again from the EE(E$^2$)PROM 32.

As described above, the threshold values $PH_{1a}, PH_{1b}$ and Ph with respect to the maximum value ($P_{max}$) of the pressure change $P_{O1}$ are automatically and accurately set.

Incidentally, 70%, 65% and 80%, which are of the threshold values $PH_{1a}, PH_{1b}$ and Ph, can be changed. These changed values are cleared by turning ON the reset switch $S_{W4}$. Afterwards, the up/down switches $S_{W1}, S_{W2}$ may be turned ON so as to set these values using the switch $S_{W3}$ after a change in the numerical value based on a 5% step has been made, for example.

Incidentally, in the above-described embodiment, the threshold values $PH_{1a}, PH_{1b}$ and the threshold value Ph are digitally set with respect to the maximum value ($P_{max}$) of the pressure change $P_{O1}$. Alternatively, however, a pressure curve indicative of the pressure change $P_{O1}$ is stored as data and the threshold values $PH_{1a}, PH_{1b}$ and Ph may be set in the same manner as described above.

Figure 6:
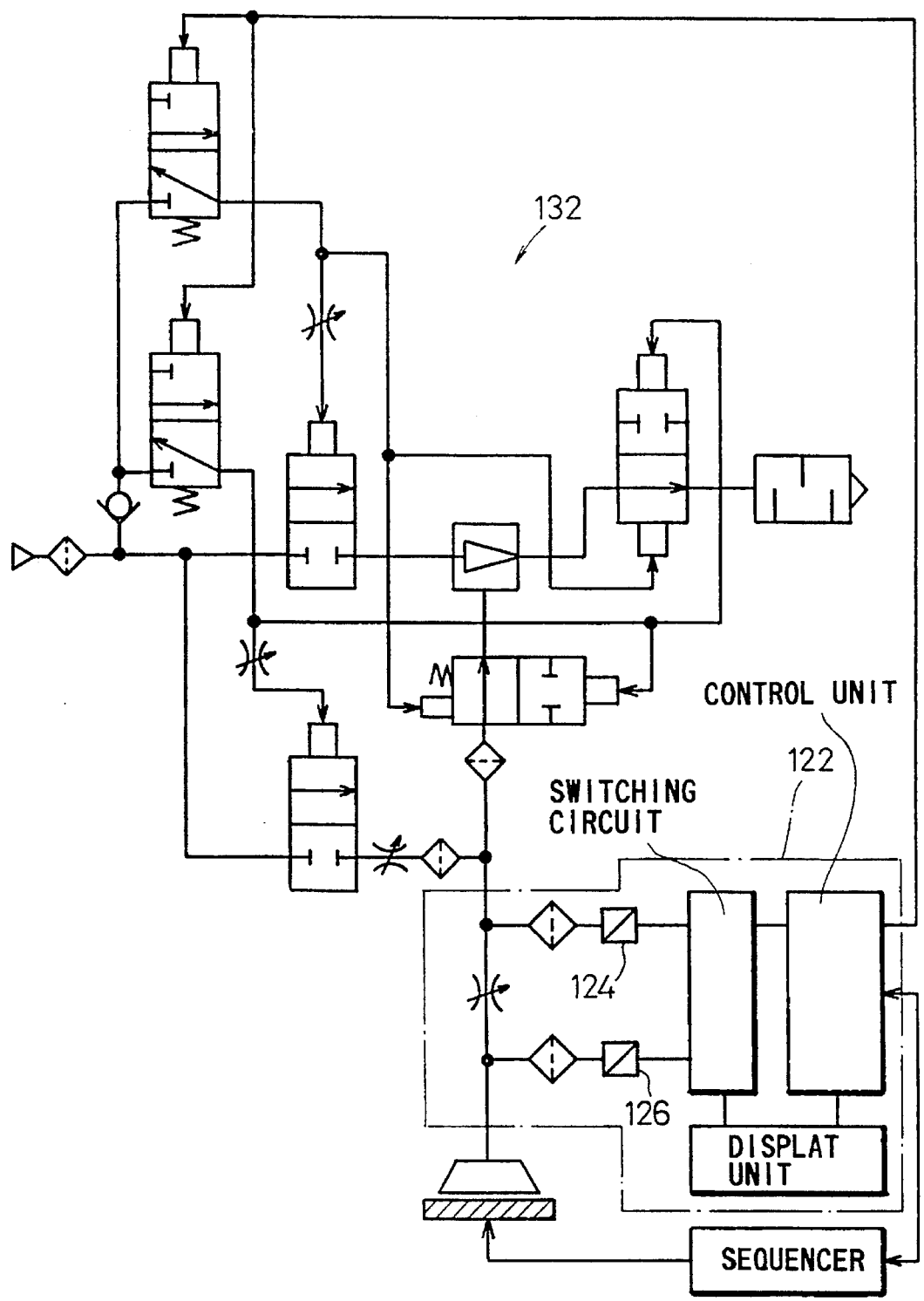
FIG. 6 is a view for describing a circuit of another embodiment of a vacuum unit according to the present invention.

FIG. 6 illustrates an embodiment directed to accommodating problems with the ejector. Vacuum unit 132 has a vacuum generating side, including an ejector 127, and a suction cup side. There is an adjusting unit 122 which includes sensor 124 for detecting vacuum levels on the vacuum generation side (and in particular, ejector 127), sensor 126 for detecting vacuum levels on the suction cup side, and control unit 128. Clogging and like problems may arise with ejector 127, thereby lowering its performance and thereby the performance of the entire vacuum unit 132. Predetermined critical values of the vacuum levels detected by sensor 126 (such as diagnostic and control levels described elsewhere to generate signals like S4 and S6) are adjusted automatically by control unit 128 as a function of the detected vacuum levels of sensor 124. The adjustment may be, for example, that when the vacuum generation side falls 50% in performance as detected by sensor 124, a predetermined critical value associated with the suction cup side as detected by sensor 126, is lowered 50% as well.

Figure 8:
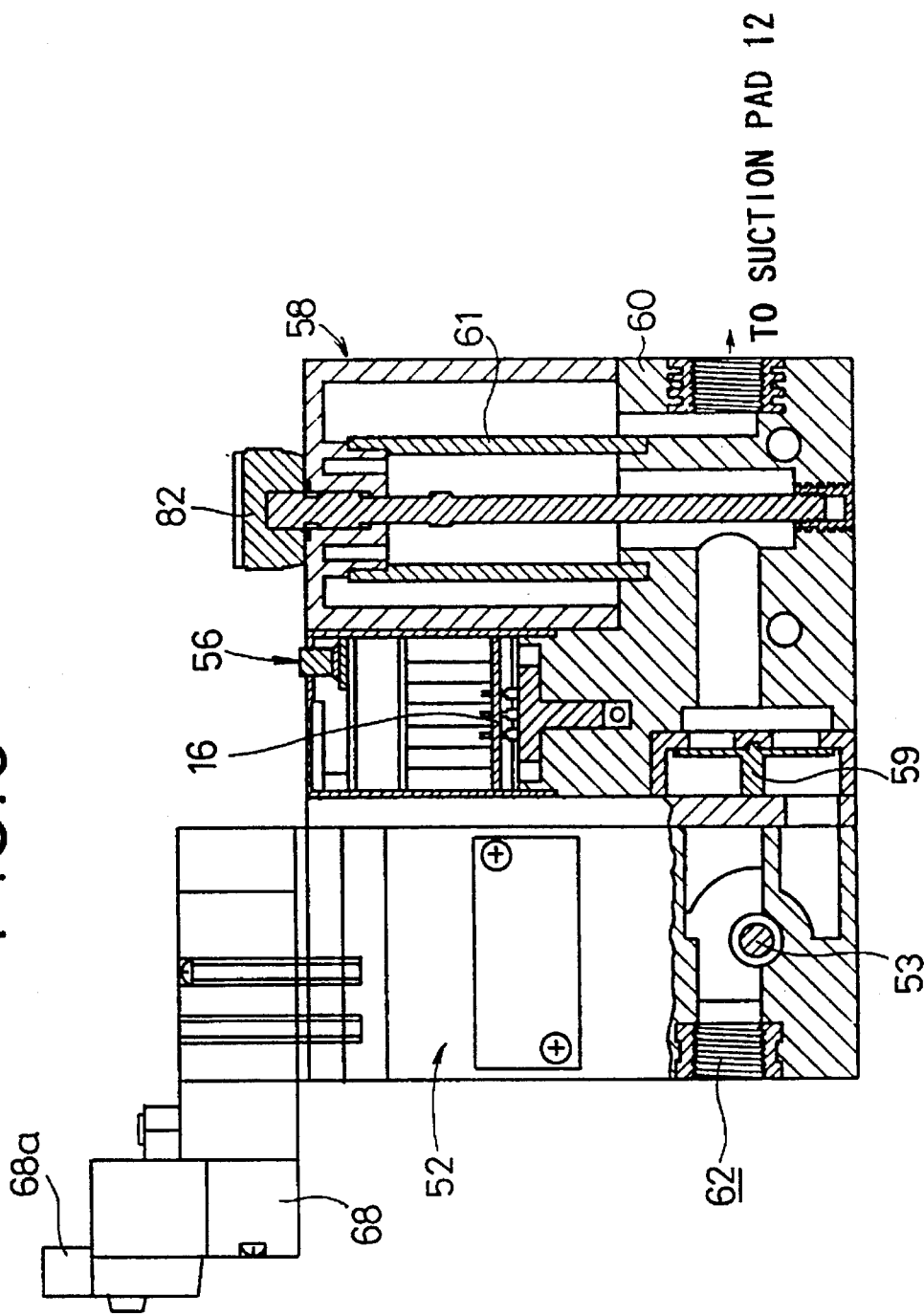
FIG. 8 is a partly-omitted vertical cross-sectional view showing a further embodiment of a vacuum unit according to the present invention.

FIG. 8 shows another embodiment illustrative of a vacuum unit as an alternative to the vacuum unit 50 of FIG. 4 in which the ejector has been incorporated. The present embodiment is constructed such that a vacuum pump (not shown) as an alternative to the ejector 54 is coupled to the port 62.

The structure of the present vacuum unit and operations and effects thereof are identical to those of the vacuum unit 50 shown in FIG. 4, and their detailed description will therefore be omitted.

Incidentally, it is needless to say that the vacuum units 50 shown in FIGS. 4 and 8 can also be plurally provided in continuation and manifolded.

Figure 9:
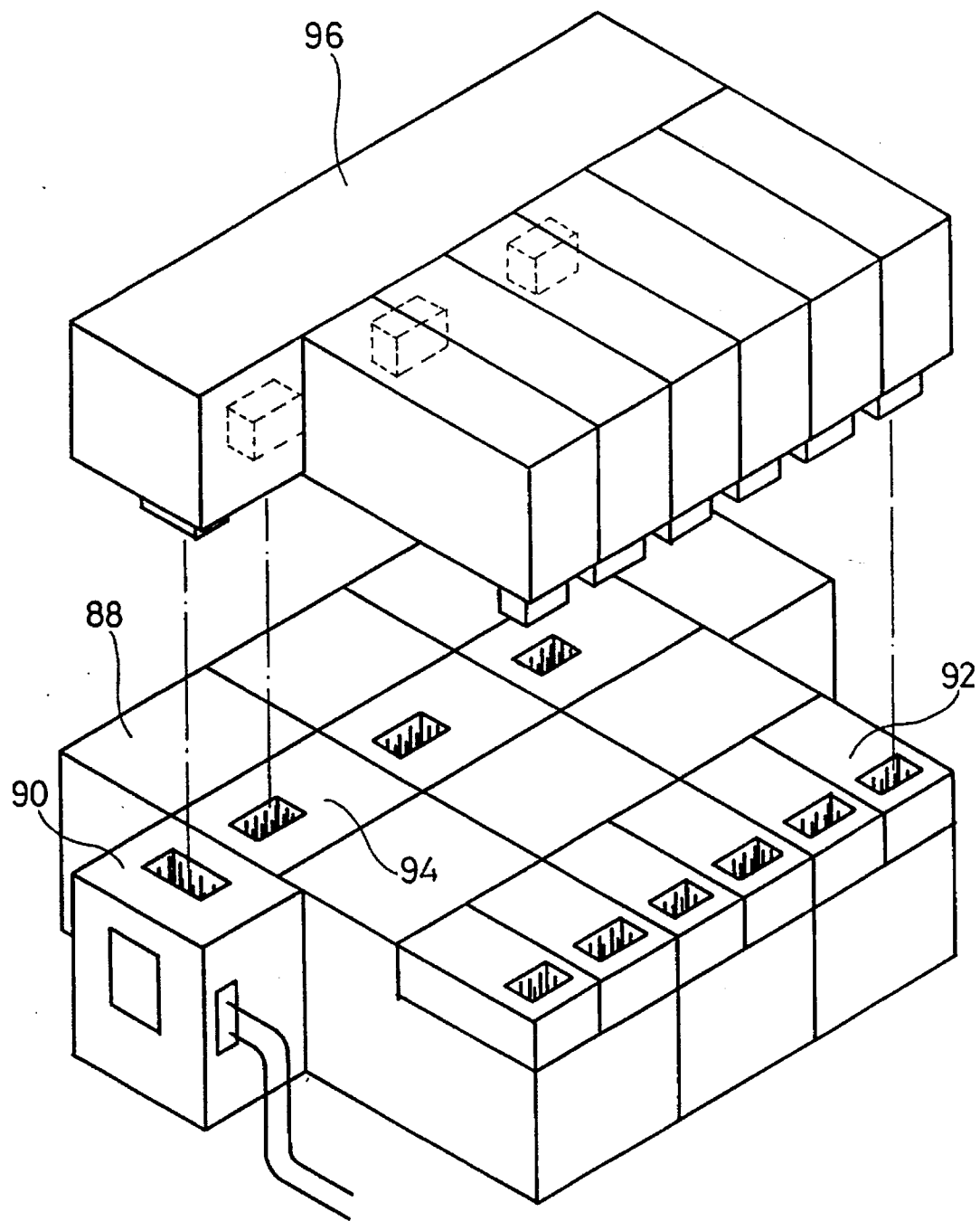
FIG. 9 is a perspective view illustrating a still further embodiment of a vacuum unit according to the present invention.

As shown in FIG. 9, a manifold 88 is provided side by side with a serial-transmission type controller 90. They can also be connected to each other by a connecting block 96 having connectors and buses disposed therein to which signals or information from an electromagnetic valve 92 and a pressure sensor 94 has been normalized.

Another embodiment of a pressure information processing system employed in a vacuum unit according to the present invention will be described below with reference to FIGS. 10 through 15.

Figure 10:
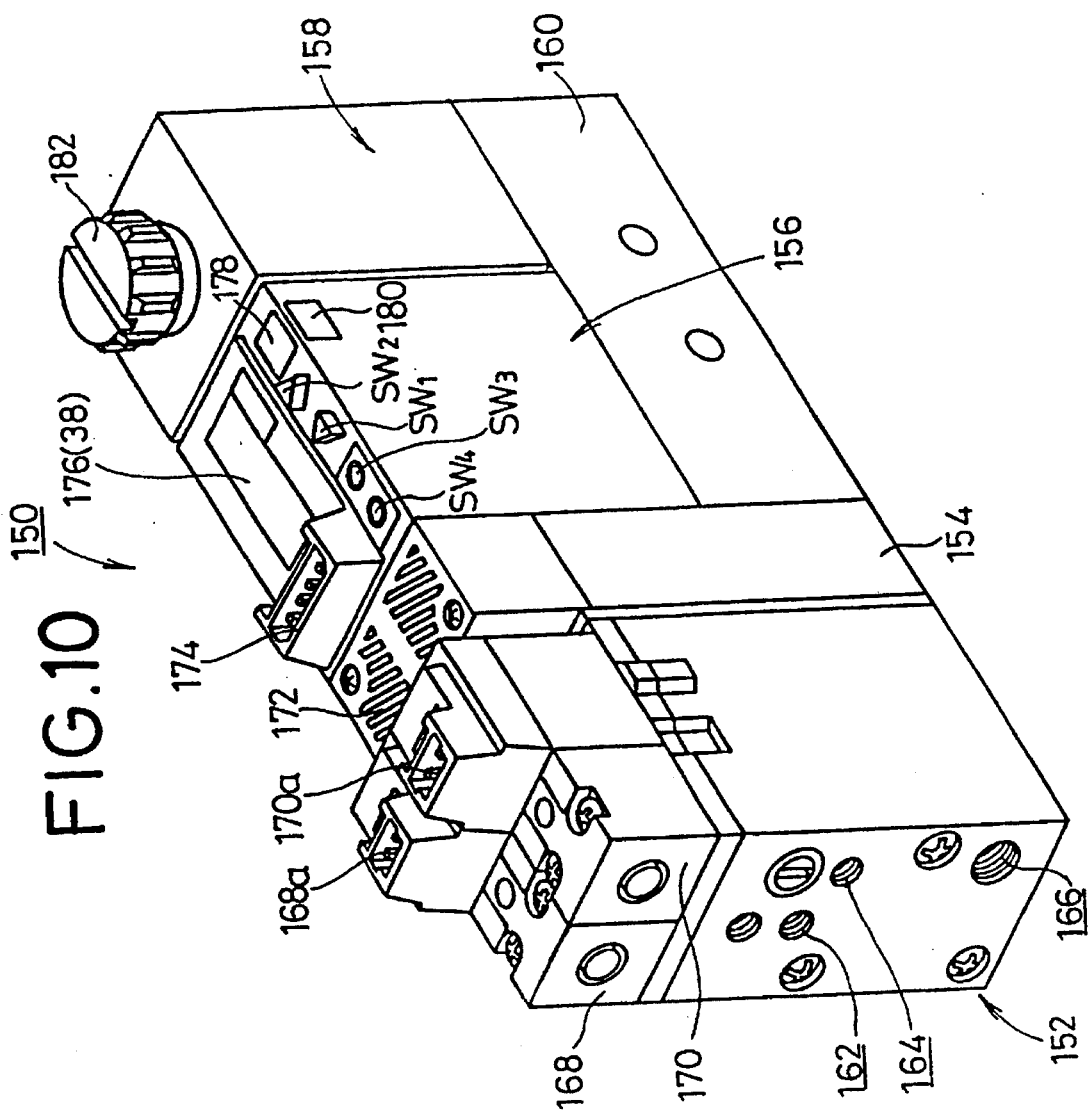
FIG. 10 is a perspective view depicting a still further embodiment of a vacuum unit according to the present invention.
Figure 11:
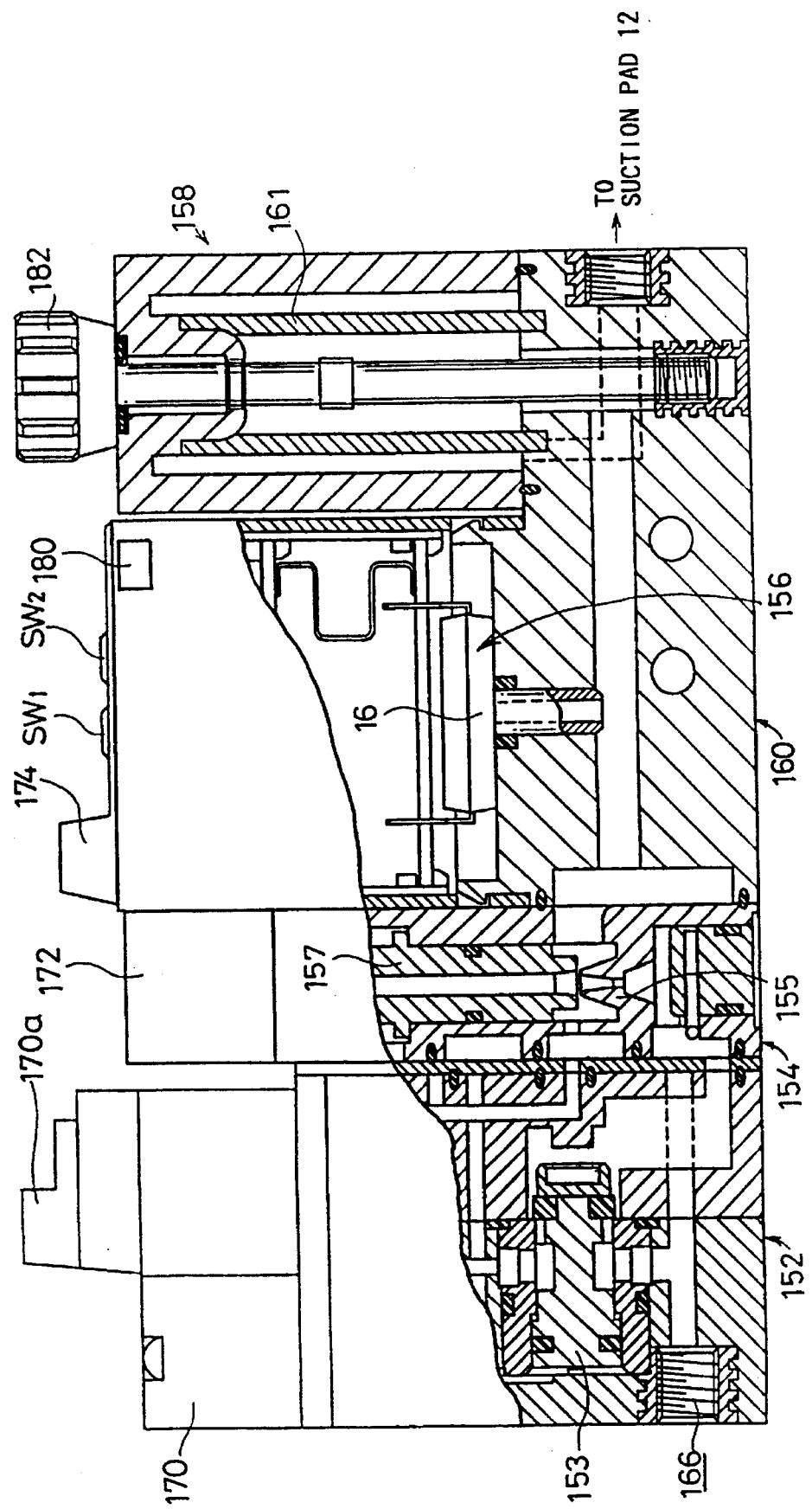
FIG. 11 is a vertical cross-sectional view, partly in cross section, illustrating the structure of the vacuum unit according to the present invention in which an ejector is incorporated.

Referring now to FIGS. 10 and 11, reference numeral 150 indicates a vacuum control apparatus. The vacuum control apparatus 150 basically comprises a valve block 152, an ejector 154, a detecting unit 156, a filter 158 and a connecting member 160. The valve block 152 has air feed ports 162, 164, 166 defined therein, a popper valve 153 disposed therein for feeding compressed air to the ejector 154 and blocking the same, and first and second electromagnetic valves 168, 170 mounted on the upper surface thereof. The first electromagnetic valve 168 is of a compressed-air feed valve, whereas the second electromagnetic valve 170 is of an electromagnetic valve for the vacuum break. In order to supply electric power and a control signal such as an ON/OFF signal to the outside via unillustrated conductors, the first and second electromagnetic valves 168 and 170 are provided with first and second connectors 168a, 170a respectively. The ejector 154 is provided adjacent to the valve block 152. In addition, the ejector 154 has a nozzle 155 and a diffuser 157 both disposed therein and a silencer 172 mounted on the upper surface thereof. The silencer 172 serves to silence sound generated by pressurized air produced from the diffuser 157 of the ejector 154. The detecting unit 156 detects pressure under vacuum and includes the semiconductor pressure sensor 16 disposed therein. The detecting unit 156 also includes, on the upper part thereof, a connector 174, a digital display unit 176, a set-value up switch $S_{W1}$, a set-value down switch $S_{W2}$, a set switch $S_{W3}$, a reset switch $S_{W4}$, and display units 178, 180. The digital display unit 176 can carry out visual representation of "failure", "break down", etc. in either English or other language, for example by using a liquid crystal or the like. The filter 158 has a main body 161 disposed therein, which includes a hydrophobic material and serves to prevent water or moisture from entering therein. In addition, the filter 158 is detachably mounted on the connecting member 160 by a control 182. Valve block 152, ejector 154, silencer 172, detecting unit 156 and filter 158 are configured for fluid communication therethrough and thereamong. In particular, there are disposed in the detecting unit 156, the semiconductor pressure sensor 16 (including the differential pressure type pressure sensor or the capacity type pressure sensor, for example) comprised of the piezo or the like, the constant-current circuit 18, the amplifier 20, the A/D converter 22, the controller 30, the EE($E^2$)PROM 32, the LCD driver 34, etc. as already described in FIG. 2. The connector 174 can be electrically-connected with conductors to produce the failure precognition signal $S_4$ and the pressure switch signal $S_6$ shown in FIG. 2. The connector 174 can also be connected with a power source relative to the detecting unit 156, and a control signal line or conductor. In addition, the connector 174 can provide a communication function for each of other vacuum control apparatus and an external control apparatus or the like so as to supply its corresponding pressure detection information or control information.

Figure 13:
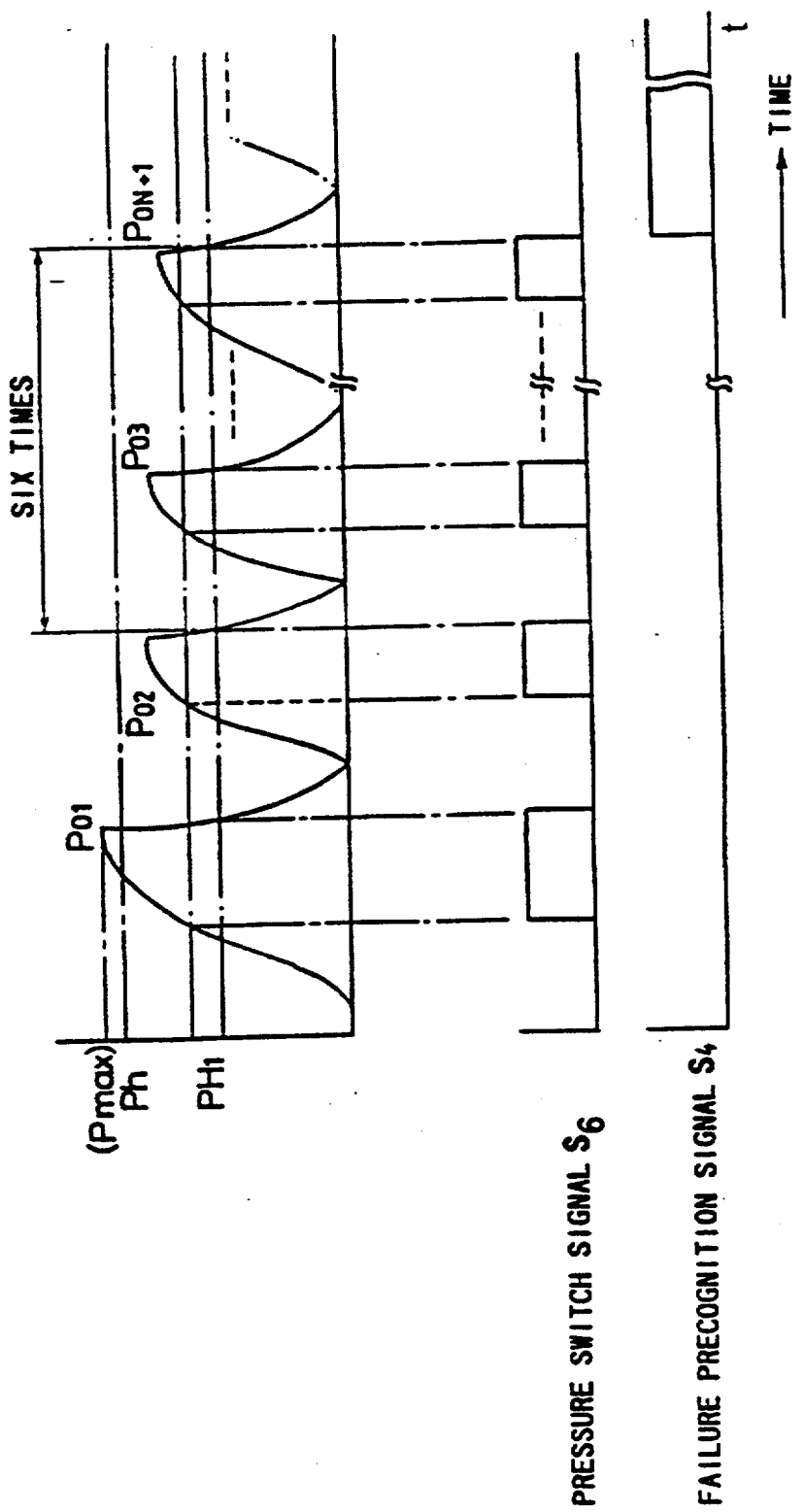
FIG. 13 is a view for describing the operation of each of the embodiments shown in FIGS. 10 through 12.

In the vacuum control apparatus constructed as described above, when an operation start instruction signal is first input, pressurized air is introduced from the air feed port 166 so as to produce a vacuum in the ejector 154. At this case, the air feed ports 162, 164 have been sealed with blank caps respectively. The so-produced vacuum brings the work suction cup 12 coupled to an unillustrated port of the connecting member 160 to the negative pressure, i.e., vacuum. Thus, the workpiece suction cup 12 attracts and holds the workpiece W in response to the operation of a conveying means such as a robot. Then, the workpiece suction cup 12 is inactivated to release the work W. As a result, the pressure (vacuum) successively applied to the semiconductor pressure sensor 16 in the detecting unit 156 is represented in the form of pressure values sequentially varied as illustrated in FIG. 13, i.e., $P_{01}, P_{02}, P_{03}, \ldots, P_{0N+1}$. As is easily understood from the drawing at this time, there is often a situation in which the highest vacuum pressure value (degree of vacuum) is reduced with the elapse of time owing to leakage of the vacuum pressure from the workpiece suction cup 12 side and filter's clogging, for example.

A signal corresponding to each of the pressure values $P_{01}, P_{02}, P_{03}, \ldots, P_{0N+1}$ is supplied via the semiconductor pressure sensor 16 and the amplifier 20 to the A/D converter 22 where it is converted into a digital detection signal $S_2$, which is, in turn, input to the controller 30.

The controller 30 has a program stored therein, which will be described later. Firstly, peak-held values of the pressure values $P_{01}, P_{02}, P_{03}, \ldots, P_{0N+1}$ under a predetermined mode specify a first address of the EE($E^2$)PROM 32 and are stored thereat. The values referred to above are successively displayed on the LCD 38 of the digital display unit 176 together with the previous respective values, for example. Then, the mode is shifted again from the predetermined mode to another and the threshold value for producing the pressure switch signal $S_6$ relative to each of the pressure values $P_{01}, P_{02}, P_{03}, \ldots, P_{0N+1}$, i.e., a so-called differential pressure $PH_1$, is set by the switches $S_{W1}$ through $S_{W4}$ under this mode. Thereafter, the mode is further changed to another so as to set a failure precognition determining vacuum Ph which defines a point reduced by, for example, 20% of the normal highest vacuum pressure value (maximum degree of vacuum) as a pressure value for making a failure precognition judgment. Then, the vacuum thus set specifies a third address and is stored thereat in the EE($E^2$)PROM 32. The differential pressure $PH_1$ is computed and the result of its computation may be stored in the EE($E^2$)PROM 32 as a value reduced by several percent to several tens percent from the maximum value ($P_{max}$) of the pressure change $P_{01}$.

Further, unusual or improper pressure values below the failure precognition determining vacuum Ph among the pressure values $P_{01}, P_{02}, P_{03}, \ldots, P_{0N+1}$ are set up (counted for setting) six times, for example. Such set values or the like are displayed on the LCD 38 and visually recognized. The LCD 38 can be angularly adjusted by a link mechanism 77 as shown in FIG. 5.

After the above pressure-value setting process has been completed, the pressure switch signal $S_6$ corresponding to the differential pressure $PH_1$ with respect to each of the pressure values $P_{01}, P_{02}, P_{03}, \ldots, P_{0N+1}$ or information about the differential pressure $P_{H1}$ is continuously produced in such a manner as to be used for full-closed control of each of various control driving means such as a delivering means and for information processing in an FMS, a CIM, etc.

On the other hand, unwanted or improper vacuum-value data Pd (corresponding to the digital detection signal $S_2$ as a signal, for example) below the failure precognition determining vacuum Ph among the pressure values $P_{01}, P_{02}, P_{03}, \ldots, P_{0N+1}$ is continuously produced six times. That is, when the count of the improper vacuum-value data Pd is performed six times, the failure precognition signal $S_4$ is continuously produced.

At this time, information about the production of the failure precognition signal $S_4$ or the like is stored in the EE(E$^2$)PROM 32 and the information can be read again from the EE(E$^2$)PROM 32 when the controller 30 is re-activated after the power source has been turned off.

The sequential control of the controller 30 for producing the failure precognition signal $S_4$ based on the program stored in the ROM 30b will now be described below.

Figure 14:
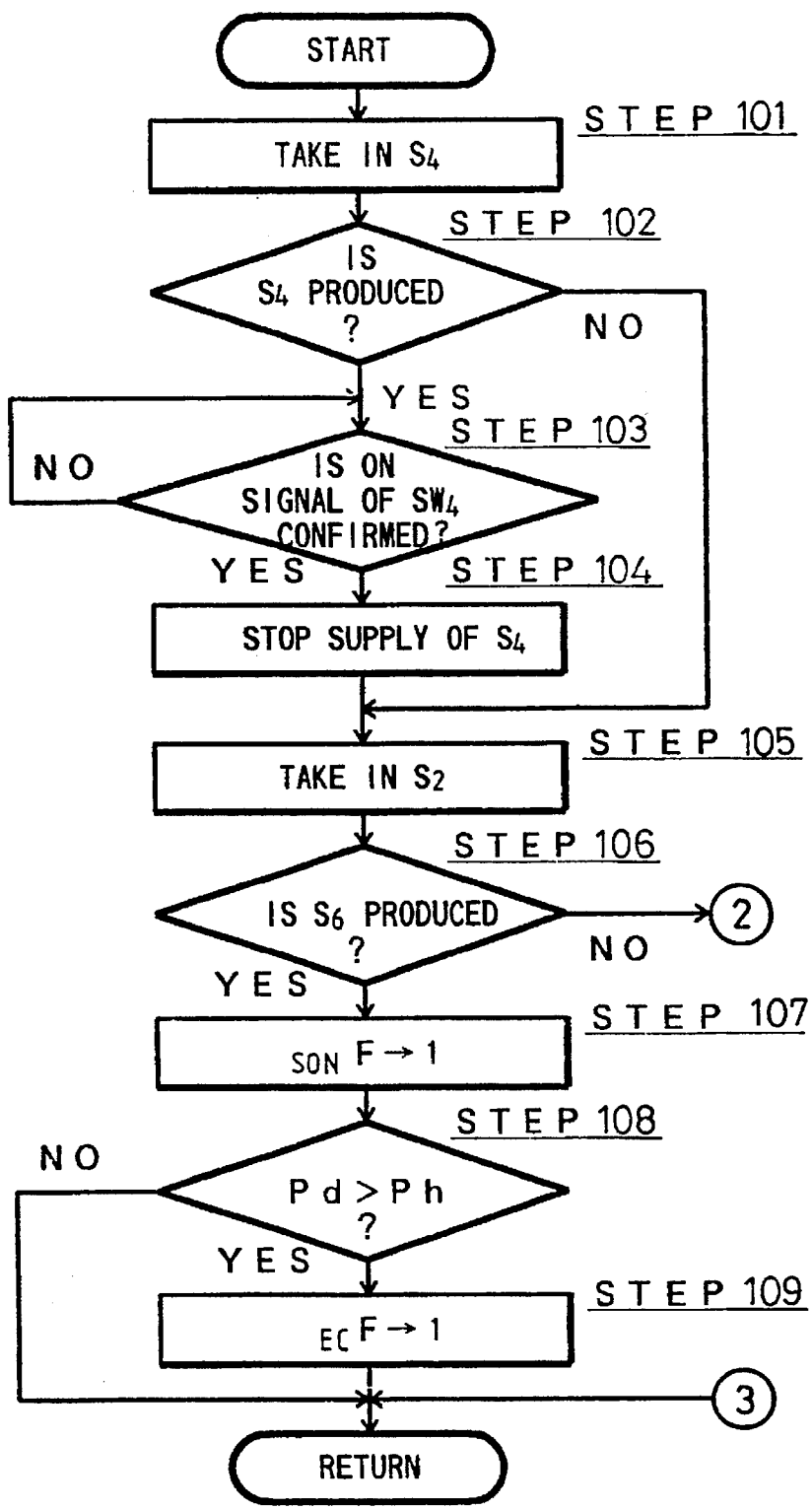
FIG. 14 is a flowchart for describing a program to be executed by a controller employed in each of the embodiments illustrated in FIGS. 10 through 12.
Figure 15:
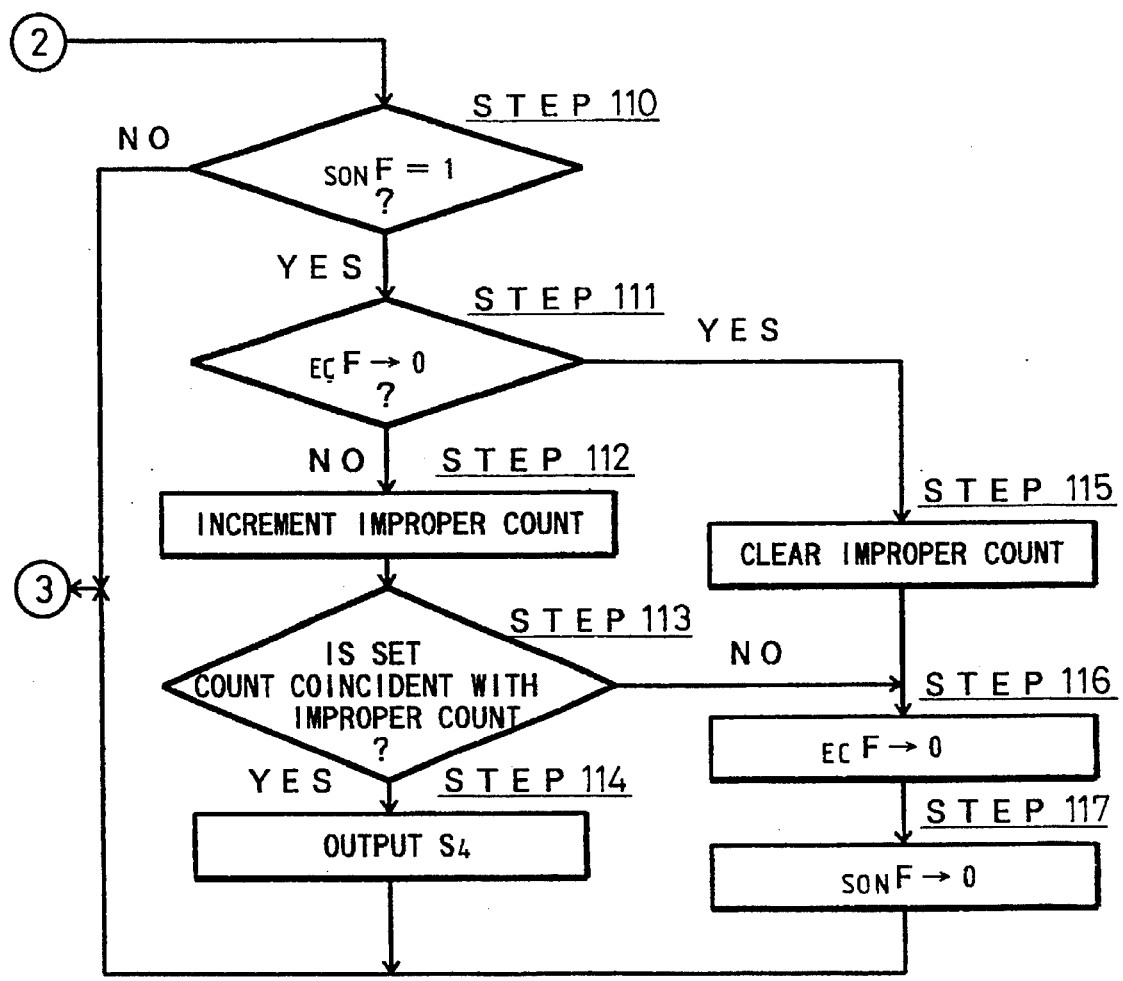
FIG. 15 is a flowchart for describing another program to be executed by the controller employed in each of the embodiments shown in FIGS. 10 through 12.
Figure 6:
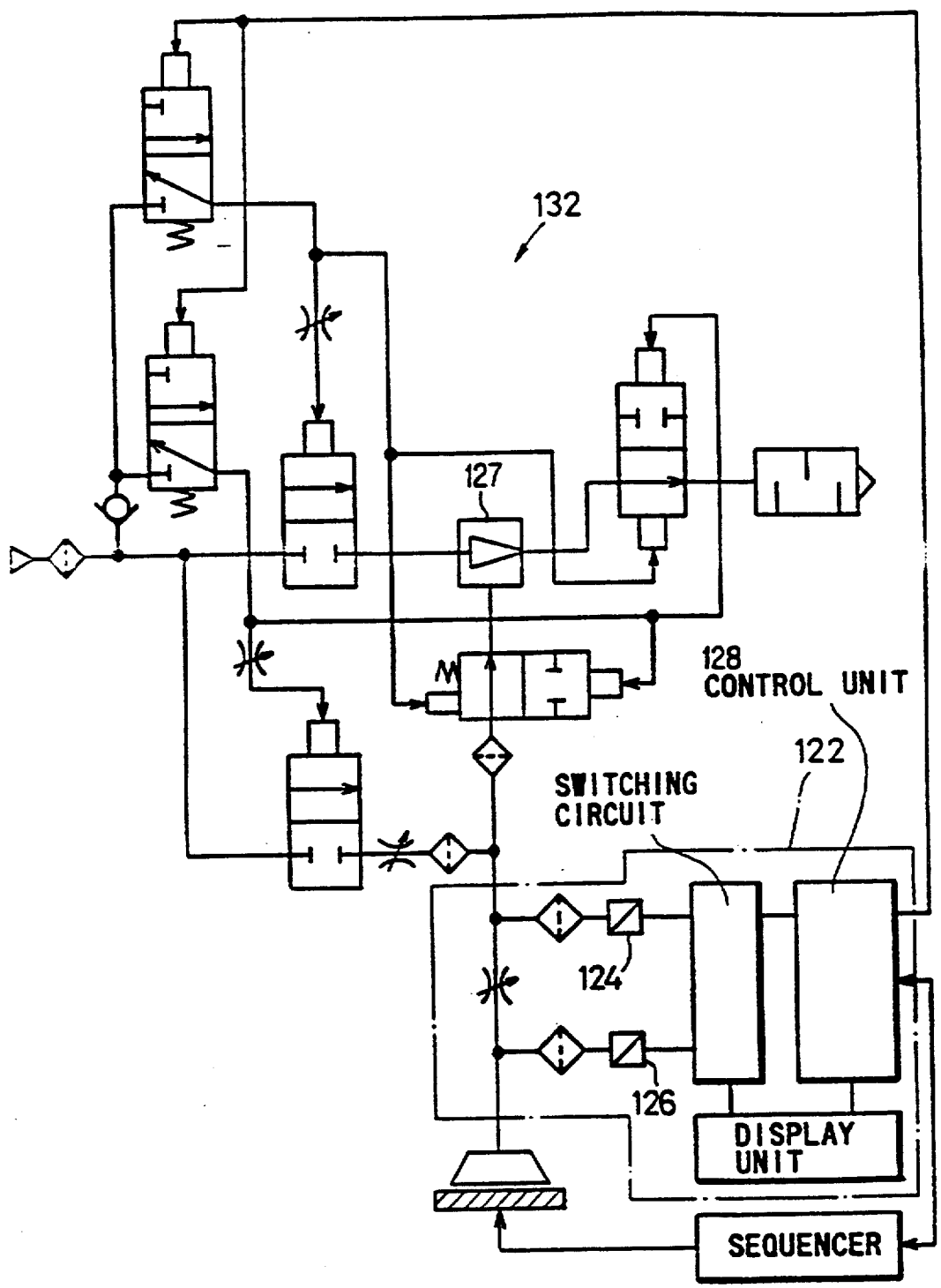

The present program is executed in such a manner that the controller 30 starts its operation in response to the input of the operation start instruction signal for the entire system or apparatus to the controller 30 (see FIGS. 14 and 15).

1l) A process for taking in the failure precognition signal $S_4$ is executed in Step 101 (see FIGS. 14 and 15).

2) A process for determining whether or not the failure precognition signal $S_4$ has been produced is executed in Step 102. If the answer is determined to be YES, then the routine procedure proceeds to Step 103. If the answer is determined to be NO, then the routine procedure .proceeds to Step 105.

3) A process for determining whether or not an ON signal has been produced when the switch $S_{W4}$ is turned on, is executed in Step 103. If the answer is determined to be NO, then the routine procedure is returned to Step 103. If the answer is determined to be YES, then the routine procedure proceeds to the next Step 104.

4) A process for indicating the stoppage of delivery of the failure precognition signal $S_4$ from the controller 30 is executed in Step 104.

A process for stopping the delivery of the failure precognition signal $S_4$ continuously produced till now in Steps 101 through 104 from the controller 30 is executed.

5) A process for allowing the controller 30 to take in the digital detection signal $S_2$ is executed in Step 105.

6) A process for determining whether or not the pressure switch signal $S_6$ has been produced is executed in Step 106. If the answer is determined to be YES, then the routine procedure proceeds to the next Step 107. If the answer is determined to be NO, then the routine procedure proceeds to Step 110.

7) A process for bringing a flag $_{SON}F$ to 1 when the pressure switch signal $S_6$ is in an ON state, is executed in Step 107. If the pressure switch signal $S_6$ is in an OFF state, then the flag $_{SON}F$ is brought to 0, and hence the flag $_{SON}F$ is down (reset).

8) A process for determining whether or not the vacuum-value data Pd (the highest vacuum pressure value of the digital detection signal $S_2$) is greater than the failure precognition determining vacuum Ph (i.e., Pd>Ph) is executed in Step 108. If the answer is determined to be NO, it is then determined that the vacuum-value data Pd is normal, and hence the routine procedure proceeds to "RETURN". If the answer is determined to be YES, then the routine procedure proceeds to the next Step 109.

9) A process for bringing a flag $_{EC}F$ to 1 when the vacuum-value data Pd exceeds the failure precognition determining vacuum Ph at the time that the pressure switch signal $S_6$ is in the ON state, is executed in Step 109. Thereafter, the routine procedure proceeds to "RETURN".

10l) If the answer is determined to be NO in Step 106, then a process for determining whether or not the flag $_{SON}F$ has been brought to 1 is executed in Step 110. If the answer is determined to be NO, then the routine procedure proceeds to "RETURN". If the answer is determined to be YES, then the routine procedure proceeds to the next Step 111.

11) A process for determining whether or not the flag $_{EC}F$ has been brought to 1 is executed in Step 111. If the answer is determined to be YES, then the routine procedure proceeds to Step 115. If the answer is determined to be NO, then the routine procedure proceeds to the next Step 112.

12) A process for performing an increment in the unusual or improper count (six times) is executed in Step 112.

13) A process for comparing each of values obtained by performing the increment in the improper count (six times) with each of set counts (six times) so as to determine based on the result of comparison whether or not they coincide with each other, is executed in Step 113. If the answer is determined to be YES, then the routine procedure proceeds to the next Step 114. If the answer is determined to be NO, then the routine procedure proceeds to Step 116.

14) A process for delivering the failure precognition signal $S_4$ from the controller provided that each incremented value (six times) in Step 113 is regarded as each set count (six times), is executed in Step 114. Thereafter, the routine procedure proceeds to "RETURN" to start the next determining process.

15) If the answer is determined to be YES in Step 106, i.e., if the vacuum-value data Pd exceeds the failure precognition determining vacuum Ph in the ON state of the pressure switch signal $S_6$, then a process for bringing its undesired result to a normal state so as to clear the unwanted or improper count is executed in Step 115.

16) A process for bringing the flag $_{EC}F$ to 0 is executed in Step 116, followed by proceeding to the next Step 117.

17) A process for bringing the flag $_{SON}F$ to 0 is executed in Step 117. Thereafter, the routine procedure proceeds to "RETURN" to start the next determining process again.

Thus, when the improper count with respect to the failure precognition determining vacuum Ph coincides with the preset number of times, i.e., the preset count at the time that the highest vacuum pressure value is lowered with the elapse of time by repeatedly performing a process for delivering or feeding the work W, for example, the failure precognition signal $S_4$ is produced to thereby previously display effective information about the time when devices such as the filter, the ejector, etc. should be replaced by new ones due to the clogging of the filter 158, the deterioration in performance of the ejector, etc., on a displaying means 176 which enables the information to be easily perceptible to vision. In addition to the supply of such effective information, the pressure values such as the failure precognition determining vacuum Ph, the differential pressure $PH_1$, etc. can be accurately and easily set up and distinctly displayed together with the present pressure value.

In the illustrated embodiment, the number of times n (unwanted or improper count) in which the vacuum-value data cannot reach the failure precognition determining vacuum Ph and the preset number of times N (set count) are respectively six times in succession. In addition, the failure precognition signal $S_4$ is produced, that is, the failure precognition signal $S_4$ corresponding to the pressure value disabling the normal work delivering process or the like is produced to provide information about a pre-judgment.

A criterion for such a previous judgment can be changed depending on the construction and the operational state of the delivering means. Thus, such a criterion is applied to, for example, a case in which a more effective and experimental value, e.g., vacuum-value data Pd produced one time cannot reach the failure precognition determining vacuum Ph, a case in which the rate at which the vacuum-value data Pd cannot reach the failure precognition determining vacuum Ph within a predetermined number of times, exceeds a predetermined value, and a case in which the rate at which the vacuum-value data Pd cannot reach the failure precognition determining vacuum Ph during a predetermined period of time, exceeds a given value. In this case, a program based on the above criterion may be executed so as to produce the failure precognition signal $S_4$ in a manner similar to the aforementioned embodiment.

Figure 12:
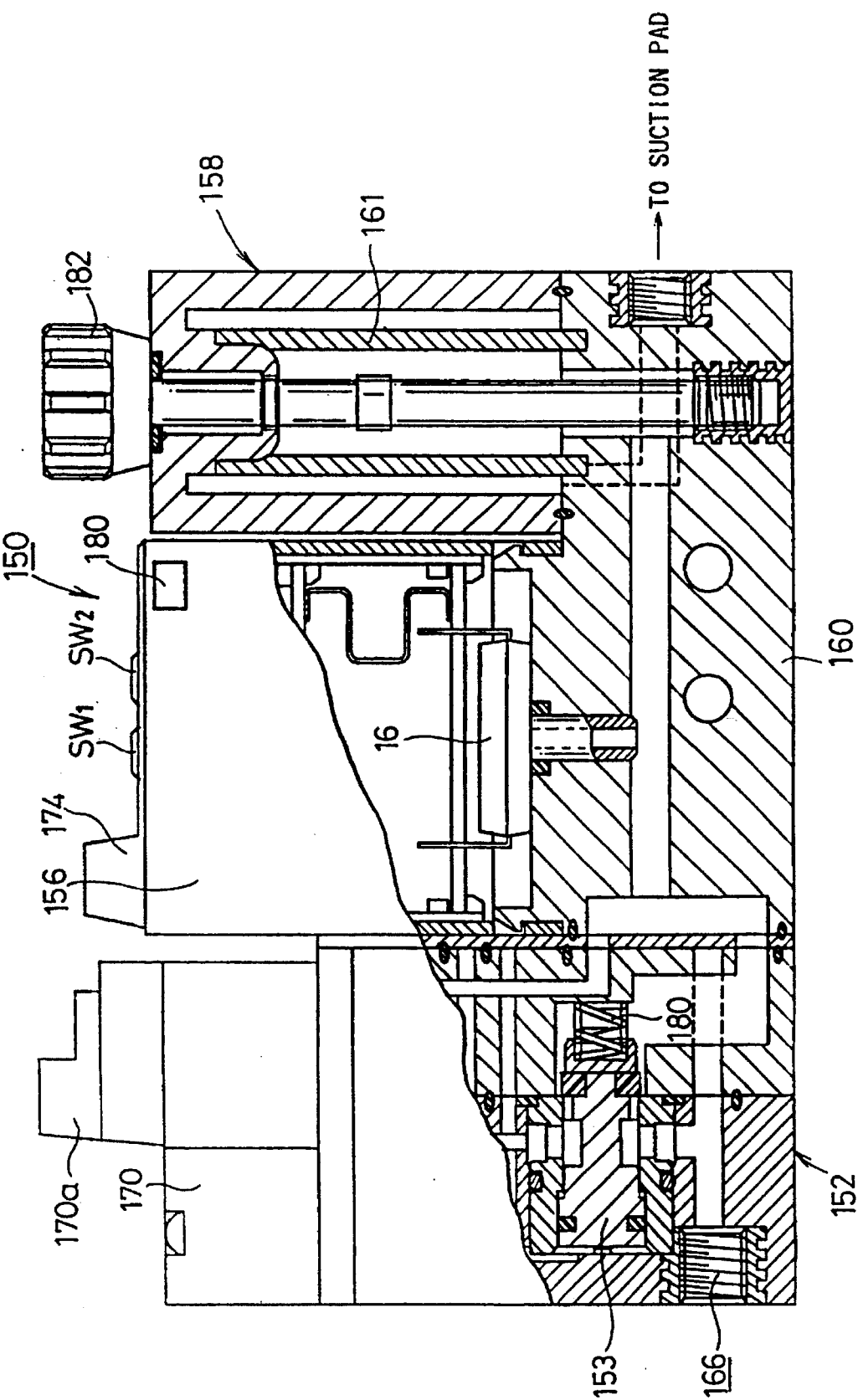
FIG. 12 is a vertical cross-sectional view, partly in cross section, showing the structure of the vacuum unit according to the present invention to which a vacuum pump is coupled.

FIG. 12 shows an embodiment different from the embodiment illustrative of the vacuum control apparatus 150 of FIG. 11 in which the ejector has been incorporated. This embodiment is constructed such that a vacuum pump (not shown) as an alternative to the ejector 154 is coupled to a port 166. Therefore, a poppet valve 153 has substantially the same shape as that of the poppet valve shown in FIG. 11. However, the poppet valve 153 is reset by a coil spring 180. The remaining construction of the present embodiment is identical to that of the vacuum control apparatus 150 shown in FIG. 11, and its detailed description will therefore be omitted. Incidentally, operations and effects of the vacuum control apparatus 150 shown in FIG. 12 are substantially identical to those of the vacuum control apparatus shown in FIG. 11.

Further, the vacuum control apparatuses shown in FIGS. 11 and 12 can also be plurally provided in continuation with one another and manifolded. The vacuum control apparatus may be set so as to have the arrangement shown in FIG. 5 of Japanese Patent Application Laid-Open Publication No. 63-154900, for example. Moreover, valves and sensor control portions (reference numerals 168a, 170a, 174 in the present embodiment) may be integrally formed to carry out processes such as control for electromagnetic valves, confirmation for the attraction of the workpiece W, precognition of a failure, and ON/OFF control for each valve. In the above-described embodiment, the threshold values are set in digital form with respect to the maximum value of the pressure values which vary with the time. However, as an alternative to the above, there is a method wherein information about a curve indicative of changes in pressure is stored and various threshold values can be set based on the stored curve information.

According to the vacuum unit of the present invention, as described above, each of pressure values relative to vacuum pressure, which are detected by a pressure detecting element, can be digitally displayed. Alternatively, each of pressure values used for a predetermined purpose can be easily set in digital form by switch means. That is, it is possible to quantitatively set a plurality of given pressure values and provide an easy operation. Further, the angular position of a displaying means can be freely adjusted, for example, thereby making it possible to visually recognize pressure values with ease when the pressure values are digitally displayed, for example.

Having now fully described the invention, it will be apparent to those skilled in the art that many changes and modifications can be made without departing from the spirit or scope of the invention as set forth herein.

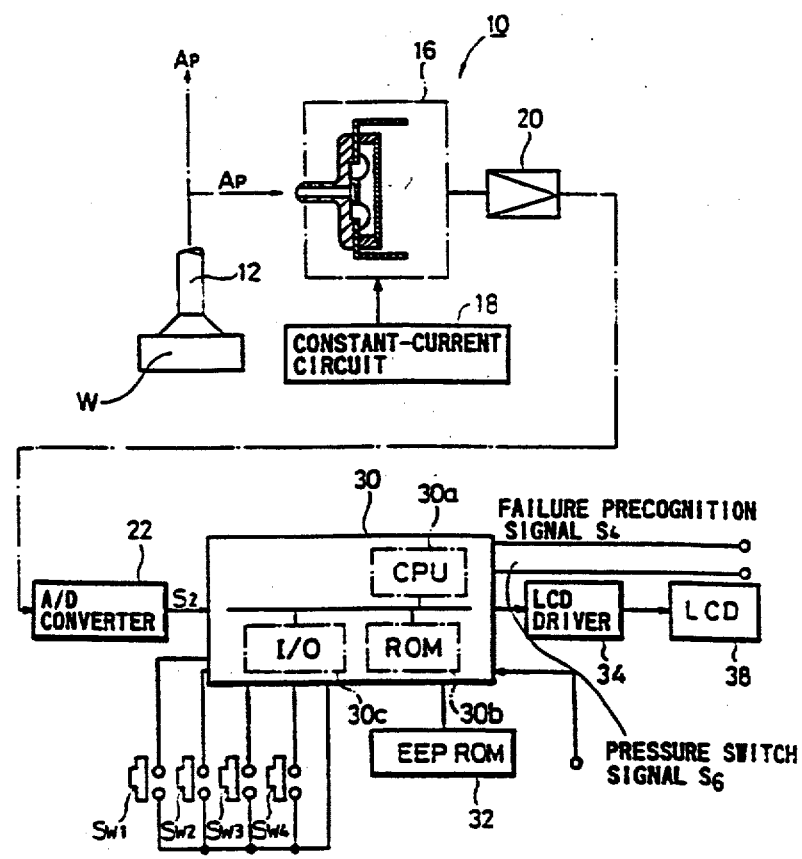

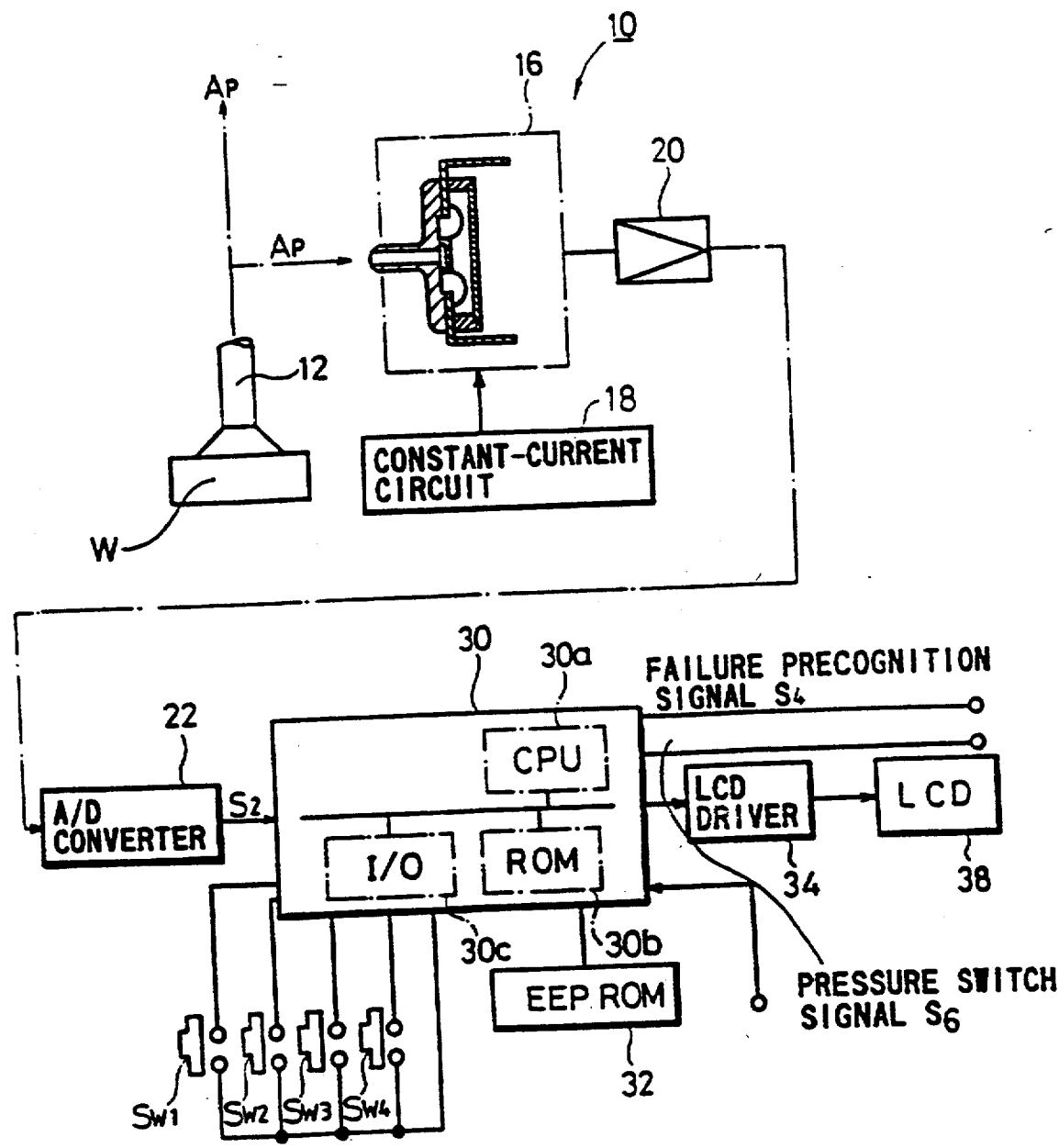

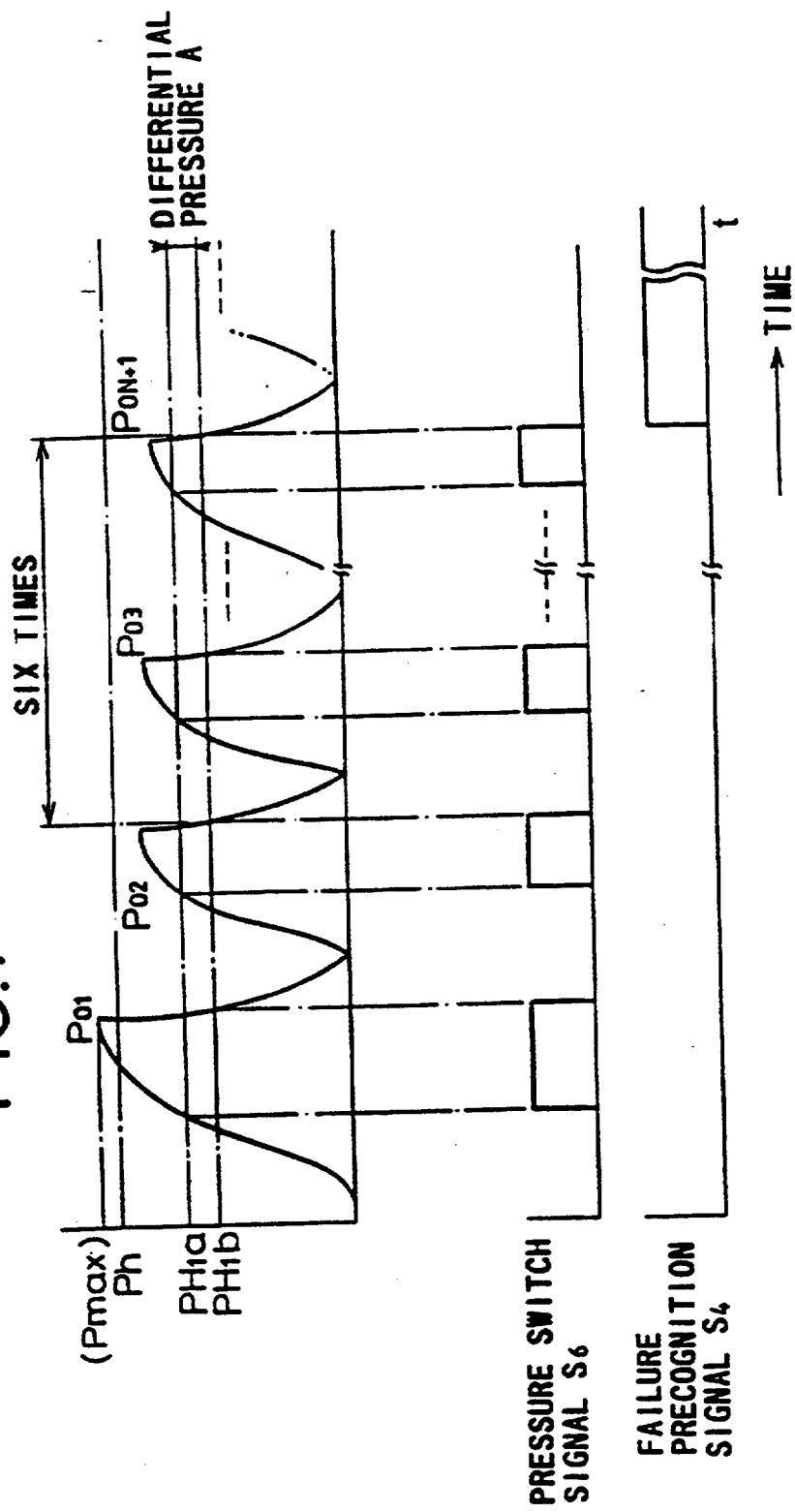

What is claimed is:

1. A system for processing pressure information for a vacuum unit operable on a workpiece, comprising:

(a) a vacuum generator for generating a vacuum;

(b) a vacuum generator detecting means for detecting a vacuum generator vacuum level of vacuum generated by said vacuum generator;

(c) an interface component which interfaces said vacuum generator with the workpiece;

(d) interface component detecting means for detecting an interface component vacuum level of vacuum in said interface component;

(e) determining means for determining whether a predetermined critical value has been met, wherein said interface component vacuum level is compared with said predetermined critical value, said predetermined critical value thereafter being adjusted as a function of said vacuum generator vacuum level to provide an adjusted predetermined critical value.

2. The system of claim 1, wherein said predetermined critical value is determined to be met if said interface component vacuum level has a local maximum value which is less than said adjusted predetermined critical value.

3. The system of claim 2, wherein said vacuum generator includes an ejector and said vacuum generator detecting means is proximate said ejector and comprises means for detecting a vacuum level.

4. The system of claim 1, further comprising control means for controlling an external device, wherein said adjusted predetermined critical value corresponds to a vacuum level in a predetermined pressure range defined by vacuum levels that have been detected by said vacuum generator detecting means, so that when said interface component vacuum level is within said predetermined pressure range, said control means is activated.

5. The system of claim 4, wherein said vacuum generator includes an ejector and said vacuum generator detecting means is proximate said ejector and comprises means for detecting a vacuum level.

6. The system of claim 1, further comprising means for determining a number of times said interface component vacuum level has a local maximum value that is less than said adjusted predetermined critical value; and wherein said predetermined critical value is determined by said determining means to be met if the number of times said interface component vacuum level has a local maximum value that is less than said adjusted predetermined critical value exceeds a predetermined number.

7. The system of claim 6, wherein said vacuum generator includes an ejector and said vacuum generator detecting means is proximate said ejector and comprises means for detecting a vacuum level.

8. A system of claim 1, further comprising display means for digitally displaying said vacuum generator vacuum level.

* * * * *

UNITED STATES PATENT AND TRADEMARK OFFICE
CERTIFICATE OF CORRECTION

PATENT NO. : 5,481,482
DATED : January 2, 1996
INVENTOR(S) : Shigekazu NAGAI, et al.

It is certified that error appears in the above-indentified patent and that said Letters Patent is hereby corrected as shown below:

Please replace formal sheets 2 of 15, 6 of 15, 7 of 15, and 13 of 15 with the attached corrected sheets.-

The title page, should be deleted to appear as per attached title page.

Signed and Sealed this

Twenty-sixth Day of March, 1996

Attest:

BRUCE LEHMAN

*Attesting Officer*     *Commissioner of Patents and Trademarks*

United States Patent [19]
Nagai et al.

[11] Patent Number: 5,481,482
[45] Date of Patent: Jan. 2, 1996

[54] PRESSURE INFORMATION PROCESSING SYSTEM SUITABLE FOR USE IN A VACUUM UNIT

[75] Inventors: Shigekazu Nagai; Shigeru Sugano; Mitsuhiro Saito; Takashi Takebayashi; Hiroshi Matsushima; Yoshiharu Ito, all of Ibaraki, Japan

[73] Assignee: SMC Kabushiki Kaisha, Tokyo, Japan

[21] Appl. No.: 293,601

[22] Filed: Aug. 22, 1994

Related U.S. Application Data

[63] Continuation of Ser. No. 941,259, Sep. 4, 1992, abandoned.

[30] Foreign Application Priority Data

Sep. 5, 1991 [JP] Japan .................................. 3-226195

[51] Int. Cl.⁶ .......................... G01L 27/00; G01L 13/00
[52] U.S. Cl. .................................... 364/558; 73/4 V
[58] Field of Search ............................ 364/558, 550; 73/4 V, 4 R, 37, 749, 753; 294/64.1, 64.2; 137/557, 526; 15/319, 339

[56] References Cited

U.S. PATENT DOCUMENTS

| | | | |
|---|---|---|---|
| 4,378,523 | 3/1983 | Norman | 73/4 V X |
| 4,687,021 | 8/1987 | Ise et al. | 137/526 |
| 4,733,431 | 3/1988 | Martin | 15/339 |
| 4,942,758 | 7/1990 | Cofield | 73/49.2 |
| 4,991,404 | 2/1991 | Yassa | 73/749 X |
| 5,117,675 | 6/1992 | Notoyama et al. | 73/37 |
| 5,201,560 | 4/1993 | Golden | 294/64.2 |
| 5,324,087 | 6/1994 | Shimose et al. | 294/64.1 |

Primary Examiner—Emanuel T. Voeltz
Assistant Examiner—M. Kemper
Attorney, Agent, or Firm—Oblon, Spivak, McClelland, Maier & Neustadt

[57] ABSTRACT

In a vacuum unit which can electrically process information, a vacuum pressure value is detected by a detecting device and a desired pressure value is set by a setting device. The so-set desired pressure value is digitally displayed on a displaying device and stored in a storing device. The set desired pressure value is compared with the detected vacuum pressure value by a determining device. When the result of comparison is brought to a given value, it is determined that an unusual or improper state has been developed. When the set desired pressure value and the detected vacuum pressure value coincide with each other in a predetermined range, a predetermined signal is produced from an output device. The displaying device is provided with an adjusting device capable of adjusting the state of visual recognition of each pressure value.

8 Claims, 15 Drawing Sheets